US012617643B2

(12) United States Patent
Visser et al.

(10) Patent No.: US 12,617,643 B2
(45) **Date of Patent: *May 5, 2026**

(54) UNWINDING SYSTEM AND METHOD FOR UNWINDING A TIRE COMPONENT FROM A STOCK REEL AND FOR OUTPUTTING SAID TIRE COMPONENT IN A TRANSPORT DIRECTION

(71) Applicant: VMI HOLLAND B.V., Epe (NL)

(72) Inventors: Ruben Visser, Epe (NL); Antonie Slots, Epe (NL); Herman Sebastiaan Scherpenhuizen, Epe (NL)

(73) Assignee: VMI HOLLAND B.V., Epe (NL)

( * ) Notice: Subject to any disclaimer, the term of this patent is extended or adjusted under 35 U.S.C. 154(b) by 148 days.

This patent is subject to a terminal disclaimer.

(21) Appl. No.: 18/564,557

(22) PCT Filed: May 9, 2022

(86) PCT No.: PCT/NL2022/050249

§ 371 (c)(1),
(2) Date: Nov. 27, 2023

(87) PCT Pub. No.: WO2022/250528

PCT Pub. Date: Dec. 1, 2022

(65) Prior Publication Data

US 2024/0253928 A1 Aug. 1, 2024

(30) Foreign Application Priority Data

May 27, 2021 (NL) ...................................... 2028310
May 27, 2021 (NL) ...................................... 2028312

(51) Int. Cl.
B65H 20/06 (2006.01)
B29D 30/00 (2006.01)
(Continued)

(52) U.S. Cl.
CPC ......... B65H 20/06 (2013.01); B29D 30/0016 (2013.01); B29D 30/2607 (2013.01);
(Continued)

(58) Field of Classification Search
CPC .... B65H 16/00; B65H 20/06; B65H 23/0204; B65H 23/0326; B65H 2301/415095;
(Continued)

(56) References Cited

U.S. PATENT DOCUMENTS 3,836,022 A 9/1974 Ims
4,951,892 A 8/1990 Chaplin et al.
(Continued)

FOREIGN PATENT DOCUMENTS

BR 9401487 A * 11/1994 ......... B29D 30/0016
CA 2372998 A1 8/2003
(Continued)

OTHER PUBLICATIONS

Korean Notice of Allowance from corresponding KR Application No. 9-5-2025-011688322, Feb. 4, 2025.
(Continued)

*Primary Examiner* — Anna M Momper
*Assistant Examiner* — Ermia E. Melika
(74) *Attorney, Agent, or Firm* — Workman Nydegger

(57) ABSTRACT

The invention relates to an unwinding system for unwinding a tire component from a stock reel and outputting said tire component in a transport direction, wherein the unwinding system comprises a reel station, a conveyor and a transfer device, wherein the conveyor extends at least partially above the reel station, wherein the transfer device comprises a retaining surface for releasably retaining the tire component along a guide path between a pick-up position for picking up the tire component from the reel station and a release position for disposing the tire component on the conveyor, (Continued)

wherein, in the release position, the retaining surface is facing towards the conveyor, and wherein the retaining surface is offset between the release position and the pick-up position over an offset angle of at least ninety degrees around an inverting axis that is parallel to the conveyor and perpendicular to the transport direction.

39 Claims, 15 Drawing Sheets

(51) Int. Cl.
| | |
|---|---|
| *B29D 30/26* | (2006.01) |
| *B65H 16/00* | (2006.01) |
| *B65H 23/02* | (2006.01) |
| *B65H 23/032* | (2006.01) |

(52) U.S. Cl.
CPC ..... *B65H 23/0204* (2013.01); *B65H 23/0326* (2013.01); *B29D 2030/0038* (2013.01); *B29D 2030/2678* (2013.01); *B29D 2030/2685* (2013.01); *B65H 16/00* (2013.01); *B65H 2301/415095* (2013.01); *B65H 2301/44312* (2013.01); *B65H 2405/572* (2013.01); *B65H 2406/34* (2013.01); *B65H 2553/42* (2013.01); *B65H 2801/93* (2013.01)

(58) Field of Classification Search
CPC ........... B65H 2301/44312; B65H 2301/52202; B65H 2405/572; B65H 2406/34; B65H 2511/216; B65H 2801/93; B29D 30/0016; B29D 30/2607; B29D 2030/2685; B29D 2030/0038
USPC ................................ 242/532.2, 532.1, 541.3
See application file for complete search history.

(56) References Cited

U.S. PATENT DOCUMENTS

| | | | |
|---|---|---|---|
| 5,273,268 A | 12/1993 | Ogata | |
| 5,282,584 A | 2/1994 | Yano | |
| 11,179,907 B2 | 11/2021 | Hasegawa | |
| 2004/0139874 A1 | 7/2004 | Koizumi et al. | |
| 2007/0075178 A1 * | 4/2007 | Hada ...................... | B65H 18/26 242/541.3 |
| 2015/0328853 A1 | 11/2015 | Denavit | |
| 2016/0229139 A1 * | 8/2016 | Grolleman .......... | B29D 30/005 |
| 2024/0253928 A1 * | 8/2024 | Visser ................ | B65H 23/0204 |

FOREIGN PATENT DOCUMENTS

| | | | | | |
|---|---|---|---|---|---|
| CN | 1457974 A | | 11/2003 | | |
| CN | 108582827 A | | 9/2018 | | |
| DE | 9213634 U1 | | 2/1994 | | |
| EP | 0146484 A2 | | 11/1984 | | |
| EP | 0649730 A1 | | 4/1995 | | |
| EP | 3312112 A1 | | 4/2018 | | |
| EP | 3698959 A1 | | 8/2020 | | |
| EP | 3795517 A1 | | 3/2021 | | |
| FR | 3102088 A1 | * | 4/2021 | ............ | B65H 18/10 |
| GB | 1495803 A | * | 12/1977 | ........ | B29D 30/0016 |
| JP | S594555 A | | 1/1984 | | |
| JP | H04283088 A | | 10/1992 | | |
| JP | 4053177 B2 | | 2/2008 | | |
| JP | 2011190061 A | | 9/2011 | | |
| JP | 6566084 B1 | | 8/2019 | | |
| JP | 6838288 B2 | | 3/2021 | | |
| KR | 20010068408 A | * | 7/2001 | | |
| KR | 20180033755 A | | 4/2018 | | |
| WO | WO-2015050437 A1 | * | 4/2015 | ........ | B29D 30/3007 |
| WO | WO-2015122761 A1 | * | 8/2015 | ............ | B29D 30/42 |
| WO | 2018208146 A1 | | 11/2018 | | |
| WO | WO-2021078500 A1 | * | 4/2021 | ........ | B29D 30/0016 |

OTHER PUBLICATIONS

Dutch Search Report from corresponding Dutch Patent Application No. NL2028310, Jan. 27, 2022.
Dutch Search Report from corresponding Dutch Patent Application No. NL2028312, Jan. 28, 2022.
International Search Report from corresponding PCT Application No. PCT/NL2022/050249, Jul. 21, 2022.
Japanese Office Action from Corresponding Japanese Patent Application No. JP2024-189264, Oct. 14, 2025.

* cited by examiner

100

112 141
102    104
110   111

181

T

S

113

D

103

108      LE     140

R

P

182

B 161          161

160

90    161

6

A

92

107

101

9

91

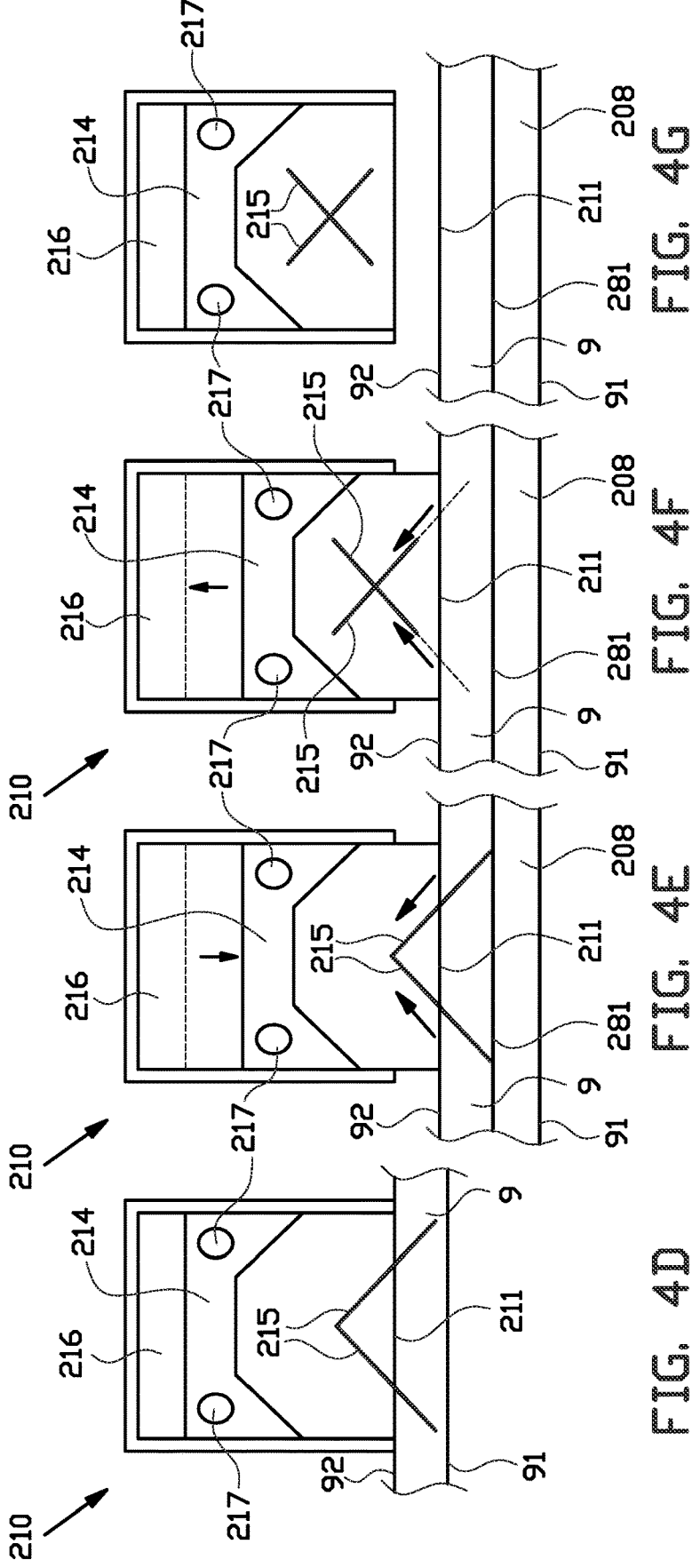

UNWINDING SYSTEM AND METHOD FOR UNWINDING A TIRE COMPONENT FROM A STOCK REEL AND FOR OUTPUTTING SAID TIRE COMPONENT IN A TRANSPORT DIRECTION

BACKGROUND

The invention relates to an unwinding system and a method for unwinding a tire component, for example a side wall or a breaker ply, from a stock reel and for outputting said tire component onto an output conveyor of a tire component servicer to be subsequently used for the manufacture of tires on a tire building drum.

Known unwinding systems are arranged for receiving a cartridge with a stock reel that holds the length of a tire component. The cartridge is commonly arranged such that the tire component exits the cartridge in a direction in-line with the transport direction of an output conveyor. When the stock reel is depleted, the cartridge is replaced by an operator and the leading end of the tire component has to be manually placed on the output conveyor. The leading end of the tire component is spliced to the trailing end of the previously supplied tire component to allow for the leading end of the tire component to be pulled by the trailing end of the previously supplied tire component over the output conveyor towards the tire building drum to be subsequently used for the manufacture of tires.

SUMMARY OF THE INVENTION

A disadvantage of the known unwinding systems is that the system has to be stopped or slowed down to allow for the manual intervention of an operator. Hence, during this period, the supply of the tire component to the tire component servicer is temporarily interrupted, thereby potentially creating downtime in the entire tire building process. Moreover, to facilitate the splicing of the leading end of the tire component to the trailing end of the previously supplied tire component, said previously supplied tire component has to remain in place on the supply conveyor until the splicing has been completed. Hence, the supply of the previously supplied tire component cannot be completed and the whole tire building process is interrupted. Additionally, safe operating spaces have to be established around the unwinding system to allow the operator to transfer the leading end of the tire component from the stock reel to the output conveyor. Said operating spaces hugely increase the footprint of the unwinding system. Even when the machine is slowed down or stopped, the manual intervention of the operator may prove hazardous.

It is an object of the present invention to provide an unwinding system and a method, wherein at least one of the above-mentioned drawbacks can be improved.

According to a first aspect, the invention provides an unwinding system for unwinding a tire component from a stock reel and for outputting said tire component in a transport direction, wherein the unwinding system comprises a reel station configured for receiving the stock reel, an output conveyor for conveying the tire component in the transport direction and a transfer device for transferring a leading end of the tire component from the reel station to said output conveyor, wherein the output conveyor extends at least partially above the reel station and comprises a support surface extending in a support plane parallel to the transport direction, wherein said support surface is arranged for receiving the tire component from the transfer device and for supporting said tire component at a first side of the support plane, wherein the transfer device comprises a retaining member which is movable along a guide path between a pick-up position at a second side of the support plane opposite to the first side of the support plane for picking up the leading end of the tire component from the reel station, and a release position at the first side of the support plane for disposing the leading end of the tire component on the support surface of the output conveyor, wherein the retaining member comprises a retaining surface for releasably retaining the leading end of the tire component to said retaining member, wherein, in the release position, the retaining surface is facing towards the support plane at the first side of said support plane, and wherein the retaining surface is offset between the release position and the pick-up position over an offset angle of at least ninety degrees around an inverting axis that is parallel to the support plane and perpendicular to the transport direction.

In other words, the transfer device is arranged to mechanically and/or automatically flip or invert the tire component between the pick-up position and the release position over at least ninety degrees. Hence the tire component can be conveyed in a transport direction differing from the output direction of the reel. Consequently, the reel can be placed at least partly below the output conveyor. Consequently, the footprint, i.e. the surface area, of the unwinding system can be reduced. Additionally, the transfer device can reliably transfer the leading end of the tire component from the stock reel to the output conveyor without the intervention of an operator. Consequently, workplace safety can be improved.

By retaining the tire component to the retaining member, the tire component can be attracted and/or retained to the retaining member from one side only. Consequently, the tire component can be placed on the support surface by the retaining member before releasing the tire component, such that the tire component is always held by either the retaining member or the support surface, or both. Therefore, it can be prevented that the tire component is transferred from the retaining member onto the support surface in an uncontrolled manner.

Preferably, the retaining member comprises a retaining body that defines the retaining surface and one or more retaining elements for retaining the leading end of the tire component to said retaining body at the retaining surface. The one or more retaining elements can effectively retain the tire component to the retaining body from one side only. More in particular, the one or more retaining elements can be arranged at or in said retaining body.

In a further embodiment, the retaining member is movable to an intermediate position between the pick-up position and the release position along the guide path, wherein, in the intermediate position, the retaining surface faces away from the support plane at the second side of said support plane. Preferably, wherein the retaining surface of the retaining member is parallel to the support plane in the intermediate position. Hence, the offset between the pick-up position and the release position can be larger than ninety degrees. In particular, the unwinding system can pick up the leading end of the tire component in a pick-up position in which the retaining surface faces away from the support plane and/or in which the retaining surface is parallel to said support plane. Thus, the reel station can be positioned further and/or entirely below the output conveyor.

In a further embodiment, the unwinding system is arranged for unwinding the tire component from the stock reel towards an output side of the reel station facing in a direction opposite to the transport direction. Preferably, wherein the retaining member, in the pick-up position, is located at said output side of the reel station. In particular, the tire component is unwound from the reel station and fed to the output conveyor at the same side of said reel station. Hence, the footprint of the unwinding system can be reduced further.

In a further advantageous embodiment, the unwinding system further comprises the stock reel at the reel station, wherein the stock reel is rotatable about a stock reel axis, and wherein the retaining surface of the retaining member faces away from the stock reel axis when the retaining member is in the pick-up position, and faces towards the stock reel axis when the retaining member in the release position. Typically, the stock reel is comprised in a cassette, cartridge or carriage, in which said stock reel is rotatably supported. Accordingly, the reel station can be arranged for receiving the cassette, cartridge or carriage, including the stock reel.

In a further embodiment, the transfer device further comprises a pressing member for pressing down the leading end of the tire component on the support surface of the output conveyor when said retaining member has released said leading end. The leading end of the tire component can thus be firmly held on the support surface of the output conveyor when releasing said leading end from the retaining surface. It can thus be prevented that the leading end slips back towards the reel station under the influence of gravity. Hence, the leading end does not have to be spliced to the trailing end of the previously supplied tire component. This means that the supply of the previously supplied tire component can be completed while at the same time the new tire component is being prepared for supply. The supply of tire components to the tire building drum can thus be more constant and/or the downtime of the tire component servicer can be reduced.

In a further embodiment, the retaining member comprises one or more vacuum retaining elements for picking-up and/or retaining the leading end by suction. Using a vacuum, the tire component can be reliably retained. Moreover, the vacuum retaining elements can be selectively activated to retain or release the tire component to or from the retaining surface.

In a further embodiment, the guide path is a circular path or a substantially circular path. The circular guide path can be convenient for flipping or inverting the tire component. Moreover, the tire component can be gradually flipped along said circular or substantially circular path. In a further embodiment, the transfer comprises an arm that is rotatable about an arm axis between the pick-up position and the release position, wherein the retaining member is carried by said arm and spaced apart from the arm axis. Preferably, the arm axis is parallel to the retaining surface. The arm can conveniently carry the retaining member along a circular or substantially circular guide path between the pick-up position and the release position.

In a further embodiment thereof, the arm axis is the inverting axis. The tire component can thus be flipped about the arm axis.

In a further embodiment, the retaining surface is offset with respect to the arm axis in an offset direction perpendicular to said retaining surface. In other words, the arm does not extend directly in radial direction between the arm axis and the retaining surface. Consequently, a clearance can be created in the radial direction between the arm axis and the retaining surface. Hence, interference between the arm and the output conveyor and/or the reel station can be prevented.

In a further embodiment, the retaining member is rotatable with respect to the arm about a retaining axis parallel to and spaced apart from the arm axis. Hence, the orientation of the retaining surface may be adapted to a starting orientation of the tire component in the pick-up position. Hence, better retention of the tire component can be obtained. Additionally, said orientation of the retaining surface may be adapted to the orientation of the support plane at the release position. Hence, the leading end of the tire component can be disposed on the support surface of the output conveyor more reliably.

In a further embodiment, the transfer device further comprises a pressing member for pressing down the leading end of the tire component on the support surface of the output conveyor when said transfer device has released said leading end, wherein the pressing member is carried by the arm between the pick-up position and the release position. The leading end of the tire component can thus be firmly held on the support surface of the output conveyor when releasing said leading end from the retaining surface by a pressing member that is carried by the same arm and therefore immediately in position at or near the retaining surface.

In an embodiment thereof, the pressing member comprises a pressing roller which is rotatable about a roller axis. Preferably, wherein the roller axis is parallel to the retaining surface. The pressing member can thus press the tire component to the support surface even when the output conveyor conveys said tire component in the transport direction, i.e. by rolling over the tire component as the tire component passes underneath in the transport direction. Hence, the tire component can be retained to said support surface by said pressing member until a length of the tire component, sufficient to retain the tire component to the support surface by friction alone, has been transferred to the output conveyor. Thus, the leading end of the tire component can be retained to said output conveyor more reliably.

In a further embodiment thereof, the pressing member comprises a pressing drive for moving the pressing roller in a pressing direction perpendicular to the roller axis. Hence, the pressing member can actively and/or adjustably press the tire component to the support surface.

In a further embodiment, the transfer device further comprises a securing member that is movable between secured position for securing the leading end to the retaining member and an unsecured position for releasing the leading end from the retaining member, wherein said securing member is carried by the arm. Hence, the securing member can secure the leading end of the tire component to the retaining surface along the entire guide path.

In a further embodiment, the transfer device further comprises a securing member that is movable between secured position for securing the leading end to the retaining member and an unsecured position for releasing the leading end from the retaining member. Hence the leading end of the tire component can actively be secured to the retaining surface of the retaining member.

In a further embodiment, the transfer device further comprises a securing member that is movable between secured position for securing the leading end to the retaining member and an unsecured position for releasing the leading end from the retaining member, wherein said securing member is carried by the arm. Hence, the securing member can secure the leading end of the tire component to the retaining surface along the entire guide path.

In an alternative embodiment, the transfer device comprises an endless drive for driving the retaining member along the guide path between the pick-up position and the release position. Said endless drive is not restricted to a rotation about a single axis, like the previously discussed arm. Instead, it may at least partly define the guide path. Hence, the guide path can be determined more freely, i.e. to make sure that the length of the tire component trailing the retained leading end stays clear from certain parts of the reel station and/or the supply conveyor.

In a further embodiment thereof, the guide path extends parallel to the support plane at or near the release position. In other words, the retaining member can travel along the output conveyor in the transport direction, preferably at the same speed as said output conveyor. Hence, said retaining member can keep retaining the leading end of the tire component when said leading end is being conveyed in the transport direction by the output conveyor. In particular, the retaining member can guide the tire component over the output conveyor until a length of the tire component, sufficient for retaining the tire component to the output conveyor by friction alone, has been positioned over said output conveyor.

In a further embodiment thereof, the guide path extends in a guide plane, wherein the endless drive comprises two endless drive elements extending parallel to said guide path and spaced apart in a lateral direction perpendicular to the guide plane. Preferably, the endless drive element is a belt or a chain. Hence, the retaining member can be simultaneously driven along the guide path by the two parallel endless drive elements. The two parallel drive elements can counteract a moment imparted on the retaining member around the guide path. Consequently, further guide means for guiding the retaining member along the guide path can be omitted.

In a further embodiment, the unwinding system further comprises a support member that is positioned opposite to the retaining surface at the pick-up position for supporting the leading end of the tire component relative to the retaining surface. Said support member can keep the leading end of the tire component in place when retaining said leading end to the retaining surface.

In an alternative embodiment thereof, the retaining member comprises at least two retractable nails that are movable between a retracted position, in which the nails are recessed with respect to the retaining surface, and a gripping position, in which said nails protrude from the retaining surface for retaining the tire component to said retaining surface. Preferably, the at least two nails each extend in a respective nail direction transverse or perpendicular to the retaining surface, wherein the nail direction of a first one of the at least two nails and the nail direction of a second one of the at least two nails extend at an oblique angle with respect to one another. The oblique angle between the at least two nails allows for the retaining member to retain the tire component in a way in which it is unlikely to unintentionally fall of the at least two nails.

In a further embodiment, the transfer device comprises at least one leading end sensor for detecting the presence of the leading end of the tire component at the retaining member. Hence, the retaining member can selectively retain the leading end of the tire component in response to a signal of the at least one leading end sensor.

In a further embodiment, the transfer device comprises two retaining surfaces for retaining two tire components, respectively, wherein the two retaining surfaces are spaced apart in a lateral direction perpendicular to said guide plane. Hence, the unwinding system can unwind two tire components simultaneously and/or in parallel. This can be especially beneficial when unwinding side walls, which are generally processed in pairs. Alternatively, the two retaining surfaces may each retain a lateral part of a single tire component.

In an embodiment thereof, said retaining surfaces are movable with respect to one another in the lateral direction. Preferably, said retaining surfaces are individually movable in the lateral direction. Hence, in the case of two tire components, the retaining surfaces may be accurately positioned at the lateral position of said tire components. In the case of a single tire component, the retaining surfaces may be accurately positioned at the lateral sides of said single tire component.

In a further embodiment thereof, the transfer device comprises at least one lateral drive for respectively moving said retaining surfaces in the lateral direction. Said at least one lateral drive may for example comprise a single spindle drive having opposing treads for simultaneously moving the retaining surfaces towards or away from one another. Alternatively, a single drive may be provided for moving one of the retaining surfaces in the lateral direction or two drives may be provided for individually moving the retaining surfaces in the lateral direction.

In a further embodiment, the retaining device comprises two lateral sensors for each detecting a lateral side of a respective one of the two tire components. Hence, the retaining surfaces may be displaced in the lateral direction in response to a sensor signal of a respective lateral sensor.

In a further embodiment, the offset angle is between one-hundred and three-hundred degrees, preferably between one-hundred-and-twenty and two-hundred-and-eighty degrees, most preferably between one-hundred-and-eighty and two-hundred-and-seventy degrees. The output conveyor may for example extend in a horizontal or substantially horizontal direction. The leading end of the tire component may for example be disposed on a set of rollers or may be freely suspended, i.e. extending in a vertical or substantially vertical direction.

According to a second aspect, the present invention provides a method for for unwinding a tire component from a stock reel and for outputting said tire component in a transport direction, using the unwinding system according to the present invention, wherein the method comprises the steps of:

using the transfer device to pick-up a leading end of the tire component originating from the stock reel at the pick-up position;

guiding the leading end along the guide path from the pick-up position to the release position while retaining said leading end to the retaining surface;

transferring said leading end onto the support surface of the output conveyor in the release position by releasing said leading end of the tire component from the retaining surface.

The method comprises the use of the system according to the present invention. Hence, the same advantages apply.

In an embodiment thereof, the method further comprises the step of:

transferring the tire component, in particular a leading end of the tire component, from the release position at the output conveyor back to the pick-up position at the reel station. Preferably, the tire component is simultaneously wound around the stock reel. Transferring at least a part of the tire component, in particular the leading end of the tire component, back towards the reel station can be useful when an unused length of the tire component remains on the output conveyor, for example when changing over to a new batch. The unused length can thus be collected in the reel station to clear the output conveyor for a new batch. Accordingly, the unused length itself can be used for another batch.

In a further embodiment thereof, the transfer device further comprises a pressing member for pressing down the leading end of the tire component on the support surface of the output conveyor, wherein the method further comprises the step of pressing down the tire component on the support surface of the output conveyor with said pressing member when the transfer device has released the tire component. The leading end of the tire component can thus be firmly held on the support surface of the output conveyor when releasing said leading end from the retaining surface.

In a further embodiment thereof, the transfer device further comprises at least one leading end sensor for detecting the presence of the leading end of the tire component at the retaining surface, wherein, prior to picking up the leading end of the tire component, the method comprises the steps of:

unwinding the tire component towards the retaining surface; and detecting the presence of the leading end at the retaining surface using the at least one leading end sensor;

wherein the step of picking up the leading end of the tire component is performed in response to the sensor signal of the at least one leading end sensor. The tire component may for example partly be unwound by driving the stock reel in rotation about the reel axis thereof. When the leading end is unwound and fed along the at least one leading end sensor, the unwinding system can automatically and/or accurately pick-up the leading end of the tire component in response to the sensor signal of said at least one leading end sensor.

In a further embodiment, the guide path extends in a guide plane, wherein the transfer device comprises two retaining surfaces for retaining two tire components, respectively, wherein the two retaining surfaces are movable relative to one another in a lateral direction perpendicular to said guide plane, wherein the retaining device further comprises two lateral sensors for each detecting a lateral side of a respective tire component, wherein, prior to picking up the leading end of the tire component, the method comprises the steps of:

detecting the respective lateral sides of the tire components using the two lateral sensors; and moving the two retaining surfaces relative to one another in response to the signals of the respective lateral sensors for positioning said retaining surfaces relative to the tire components. Hence, the retaining surfaces may be accurately positioned at the lateral position of said tire components in response to the sensor signals of the two lateral sensors. Alternatively, in the case of a single tire component, the retaining surfaces may be accurately positioned at the lateral sides of said single tire component in response to the sensor signals of the two lateral sensors.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 4A-4G show a detailed section view of a retaining member of the transfer device of the alternative unwinding system according to FIGS. 2A-2D during the different modes of its operation;

DETAILED DESCRIPTION OF THE INVENTION

Figure 1A:
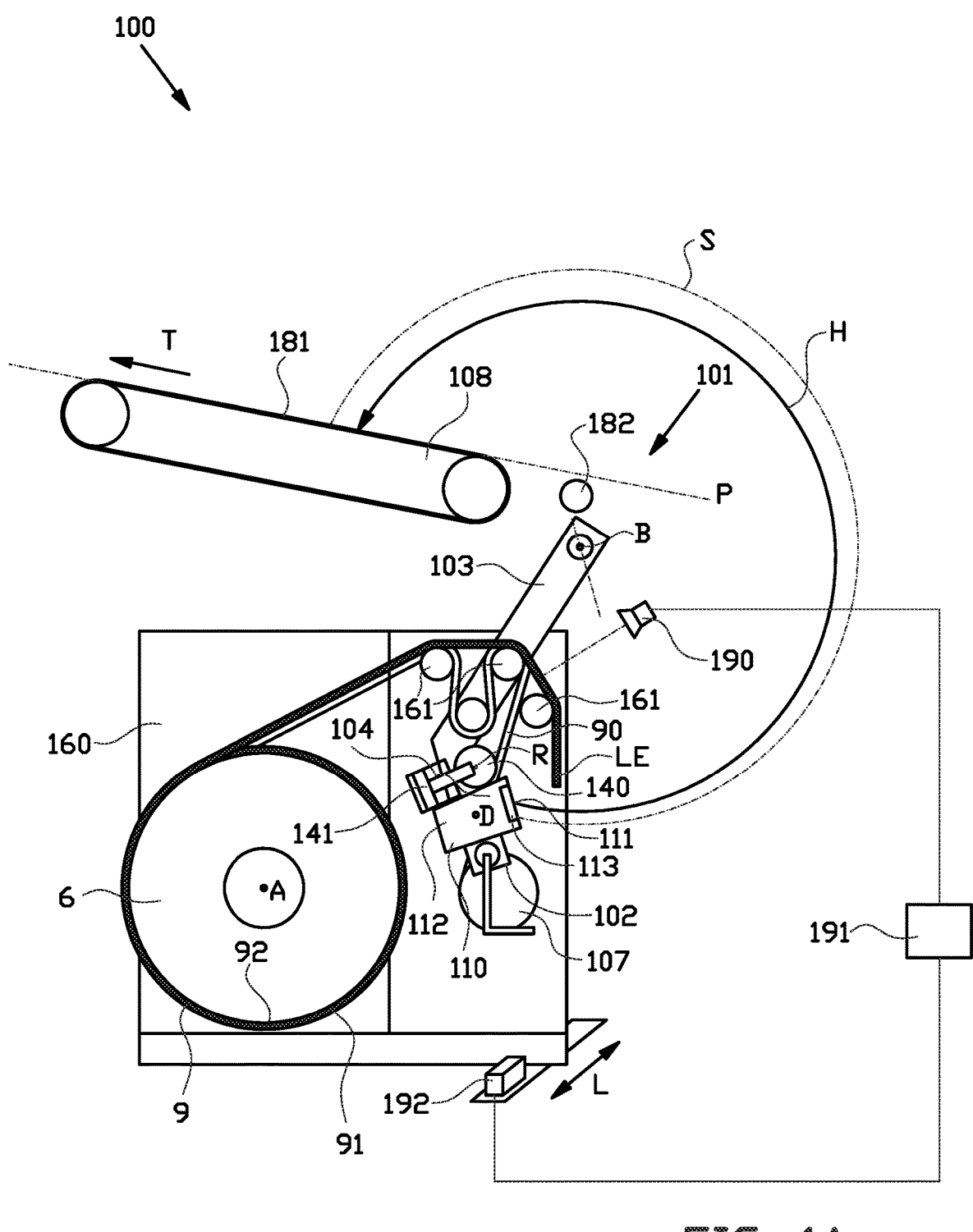
FIGS. 1A-1G show side views of an unwinding system during a process of transferring a tire component from a stock reel to an output conveyor of the unwinding system, according to a first exemplary embodiment of the invention.

FIGS. 1A-1G show an unwinding system 100 or let off system for unwinding a tire component 9 from a stock reel 6 and for outputting said tire component 9 in a transport direction T. The unwinding system 100 comprises a reel station 160 for receiving said stock reel 6 and a output conveyor 108 for conveying the tire component 9 in the transport direction T.

As is shown in FIGS. 1A-1G, the output conveyor 108 extends at least partially above the reel station 160. The output conveyor 108 comprises a support surface 181 extending in a support plane P for supporting the tire component 9 at a first side of said support plane P. The support plane P extends parallel to the transport direction T. Preferably, the output conveyor 108 further comprises a loop wheel 182 for supporting and guiding a loop of the tire component 9 towards the support surface 181. Said loop wheel 182 is rotatable about a rotation axis parallel to the support plane P and perpendicular to the transport direction T.

In the process of tire building, tire components 9 or intermediate products thereof are often wound around a stock reel 6 for storage and/or transport between processes. The tire component 9 may subsequently be unwound from the stock reel 6 to be used in a further process.

In the embodiment as shown, the unwinding system 100 comprises a single reel station 160 for receiving the stock reel 6. However, the unwinding system 100 may comprise several reel stations 160 for receiving multiple stock reels 6 such that, when a stock reel 6 is depleted, the unwinding system 100 may switch to unwinding a next stock reel 6. The reel station 160 is located below the output conveyor 108, i.e. at a second side of the support plane P opposite to the first side of said support plane P.

The stock reel 6 is rotatable about a central axis A for winding and/or unwinding the tire component 9. The stock reel comprises a circumferential surface 61 extending circumferentially about said central axis A and facing radially outward with respect to said central axis A. The tire component 9 stored on the stock reel 6 is at least partially wound around said circumferential surface 61.

The tire component 9 is typically wound around the circumferential surface 61 together with a liner 90 to prevent consecutive windings of said tire component 9 from sticking together. Preferably, the reel station 160 further comprises a liner reel 107 for receiving the liner 90. Before processing the tire component 9, the tire component 9 and the liner 90 are separated by winding the liner 90 around the liner reel 107. The liner reel 107 may be comprised in the reel carriage or reel cassette as well. For clarity, the liner reel 107 has been omitted from FIGS. 1A and 1B.

The tire component 9 comprises a first surface 91 which faces radially outwards when the tire component 9 is wound around the circumferential surface 61. The tire component 9 further comprises a second surface 92 opposite to said first surface 91. The second surface 92 faces radially inward when the tire component 9 is wound around the circumferential surface 61 of the reel 6.

The reel station 160 is arranged for receiving the stock reel 6, such that said stock reel 6 is rotatable about the central axis A thereof. The unwinding system 100 is arranged for rotating the stock reel 6 about the central axis A thereof for unwinding the tire component 9 from the stock reel 6 towards an output side of the reel station 160 facing in a direction opposite to the transport direction T.

The reel station 160 may comprise a drive (not shown) for driving the stock reel 6 in rotation about the central axis A thereof for unwinding the tire component 9. Alternatively, the unwinding of the tire component 9 may be driven by the output conveyor 108. The reel station 160 comprises a plurality of guide rolls 161 for guiding the leading end LE of the tire component 9 towards a pick-up position at the output side of the reel station 160, as is shown in FIG. 1B. The pick-up position is located at the second side of the support plane P. In said pick-up position, the leading end LE is suspended from the guide rolls 161. i.e. the leading end extends in a vertical or substantially vertical direction due to the force of gravity.

The stock reel 6 is typically comprised in a reel carriage or reel cassette (not shown). In this case, the reel station 160 is arranged for receiving said reel cassette or reel carriage. The reel carriage or reel cassette may also comprise the guide rolls 161. Consequently, the leading end LE of the tire component 9 may readily be in the pick-up position when said reel carriage or reel cassette is received in the reel station 160.

Figure 1B:
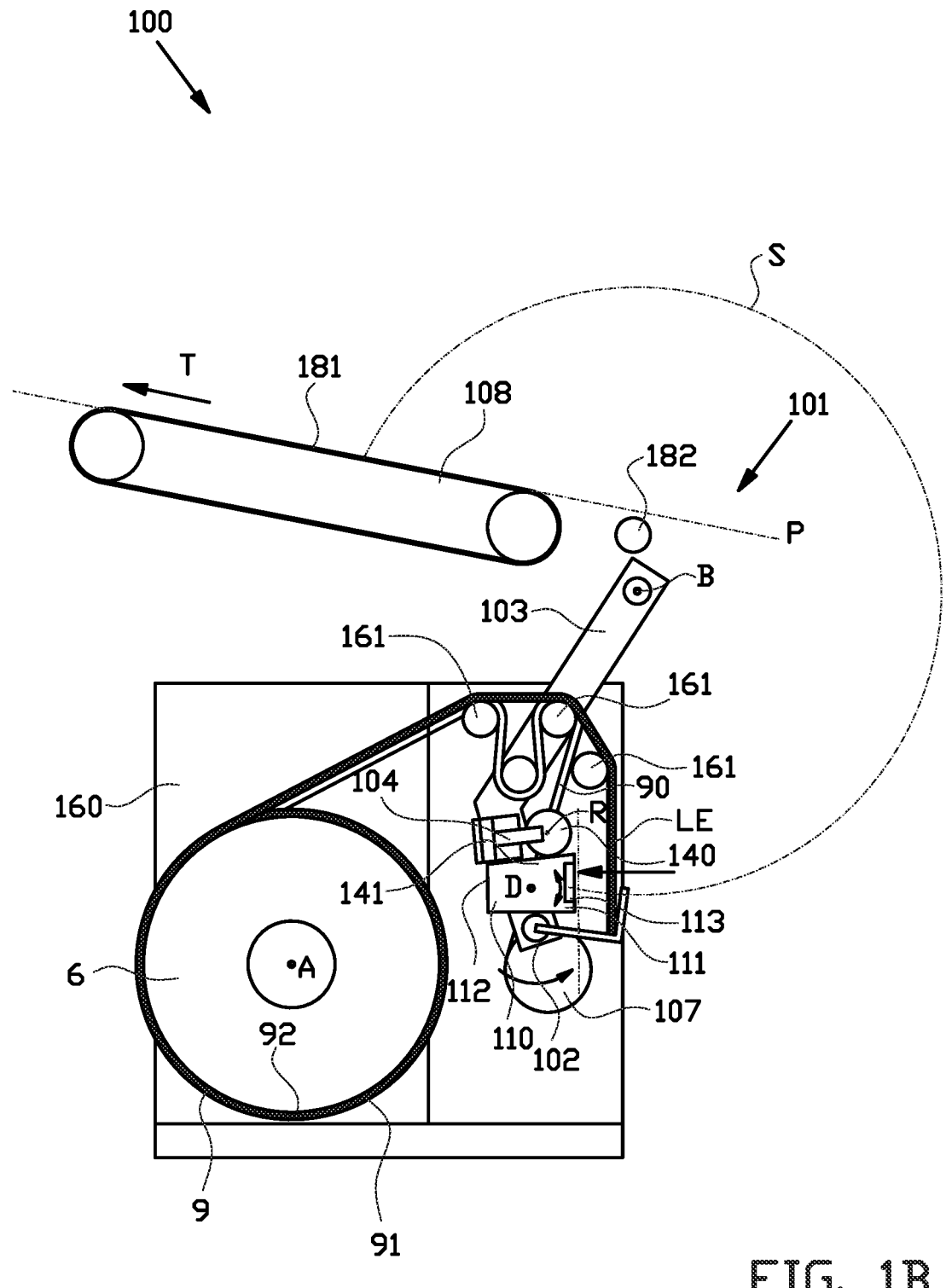

As shown in FIG. 1A, the unwinding system 100 may further be provided with a sensor 190, in particular a camera, for detecting a parameter indicative of the lateral position, for example the lateral center or the lateral side edges of the tire component 9, at the leading end LE of said tire component 9 in a lateral direction L perpendicular to the transport direction T and/or parallel to the support plane P. The sensor 190 is configured for observing the leading end LE of the tire component 9 prior to its transfer to the output conveyor 108. In this example, the sensor 190 is located at or upstream of the pick-up position, more in particular at or between the guide rolls 161. The unwinding system 100 further comprises a lateral drive 192 for generating a relative displacement between the reel carriage, the reel cassette or the reel station 160 as a whole in the lateral direction L relative to the output conveyor 108. In this example, the lateral drive 192 moves the reel carriage, the reel cassette or the reel station 160 as a whole.

The unwinding system 100 further comprises a control unit 191 that is operationally, electronically and/or functionally connected to the sensor 190 and the lateral drive 192 for controlling the lateral drive 192 in response to signals received and/or processed by the control unit 191 from the sensor 190.

FIGS. 2A-2D, show an alternative reel station 260. As is shown in said figures, the tire component 9 is typically wound around the circumferential surface 61 together with a liner 90 to prevent consecutive windings of said tire component 9 from sticking together. The alternative reel station 260 further comprises a liner reel 207. Before processing the tire component 9, the tire component 9 and the liner 90 are separated by winding the liner 90 around a liner reel 207. The liner reel 207 may be comprised in the reel carriage or reel cassette as well.

Figure 1C:
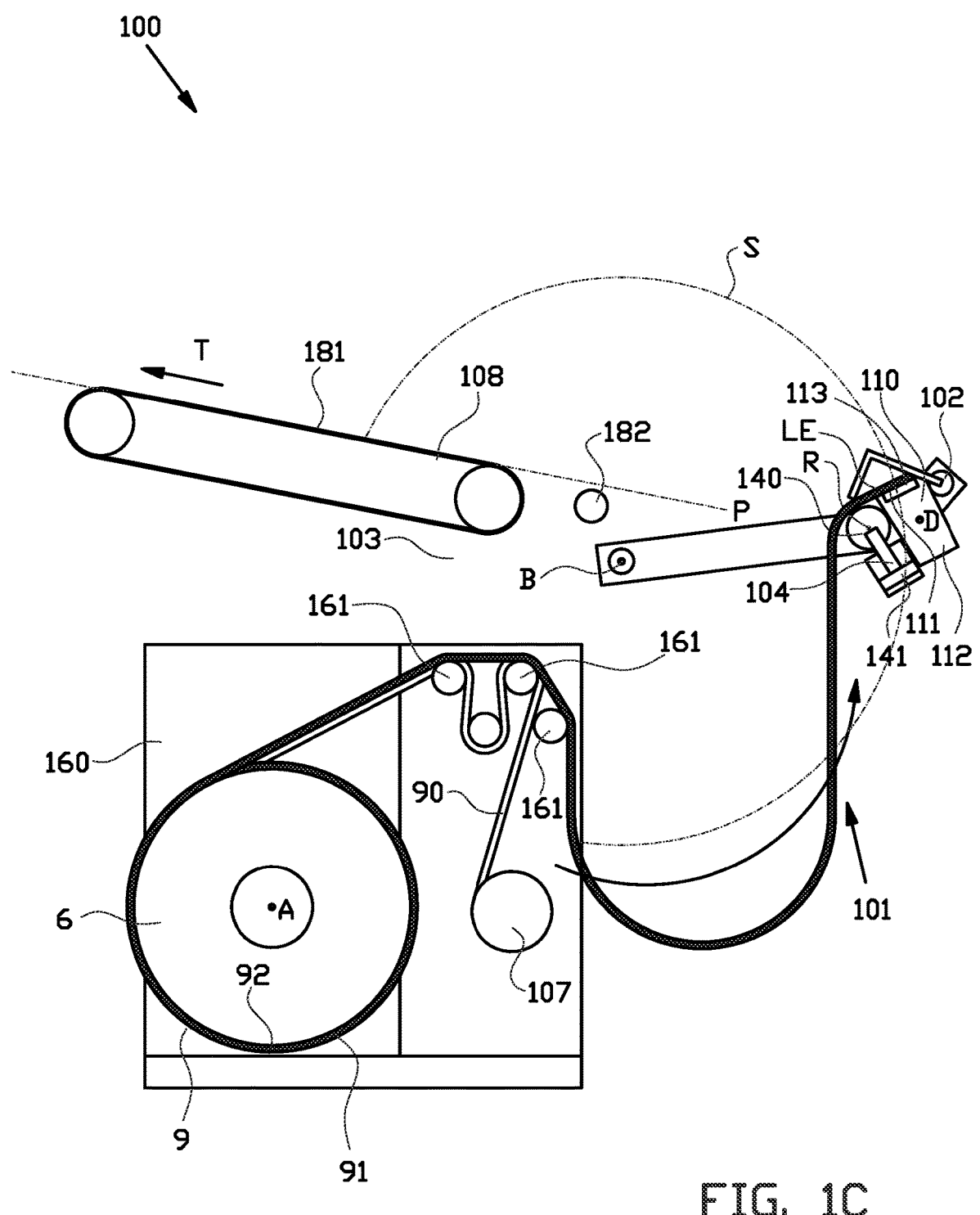
Figure 1D:
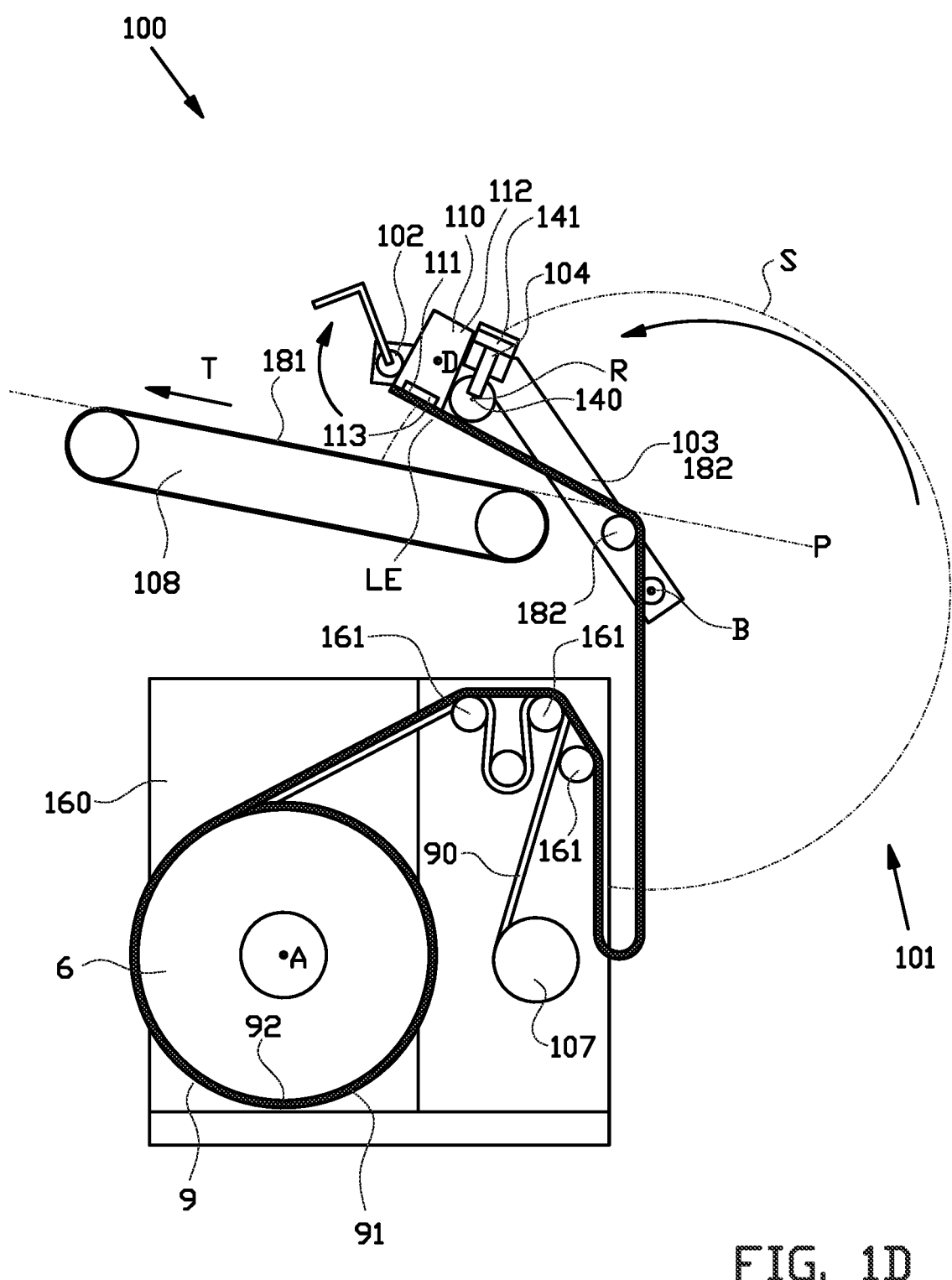
Figure 1E:
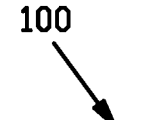

As is further shown in FIGS. 1A-1G, the unwinding system 100 further comprises a transfer device 101 for transferring the leading end LE of the tire component from the reel station 160 to the output conveyor 108. In particular, the transfer device 101 is arranged for picking up the leading end LE of the tire component 9 at the pick-up position at or near the reel station 106 and for disposing said leading end LE at a release position on the output conveyor 108 as is shown in FIG. 1E.

The transfer device 101 comprises a retaining member 110 which is movable along a guide path S between the pick-up position and the release position. Preferably, said guide path S extends in a guide plane transverse or perpendicular to the support plane P. In the pick-up position, the retaining member 110 is located at the output side of the reel station 160.

The retaining member 110 comprises a retaining surface 111 for releasably retaining the leading end LE of the tire component 9 to said retaining member 110 along the guide path S. The retaining member 110 comprises a retaining body 112 that forms or defines the retaining surface 111 for engaging and/or retaining the leading end LE of the tire component 9. Said retaining member 110 may for example comprise one or more retaining elements 113, in particular vacuum retaining elements or magnetic retaining elements, for picking up and/or retaining the leading end by suction or magnetic force. The one or more retaining elements 113 are provided in or at the retaining body 112 and are arranged for engaging and/or attracting the tire component 9 towards the retaining body 112, thereby retaining said tire component 9 to the retaining body 112.

As is shown in FIG. 1E, in the release position, the retaining surface 111 is facing towards the support plane P at the first side of said support plane P. In other words, the retaining surface 111 is facing towards the stock reel axis A. In the pick-up position, said retaining surface 111 faces away from the stock reel axis A. In particular, in the pick-up position, as is shown in FIG. 1B, the retaining surface 111 is offset with respect to the release position over an offset angle H around an inverting axis that is parallel to the support plane P and perpendicular to the transport direction T. In other words, the tire component is flipped or inverted about said inverting axis between the pick-up position and the release position. In the pick-up position, said retaining surface 111 away from the in the exemplary embodiment as shown, the offset angle H is about two-hundred- and seventy degrees. Preferably, the offset angle H is at least ninety degrees. More preferably, the offset angle H is between one-hundred and three-hundred degrees. Even more preferably the offset angle H is between one-hundred-and-twenty and two-hundred-and-eighty degrees. Most preferably the offset angle is between one-hundred-and-eighty and two-hundred-and-seventy degrees.

As is for example shown in FIG. 1C, the retaining member 110 is further movable along the guide path S to an intermediate position between the pick-up position and the release position. In the intermediate position, the retaining surface 111 faces away from the support plane P at the second side of said support plane P. Preferably, the retaining member 110 is further movable in an intermediate position, facing away from the support plane P at the second side of said support plane P, in which the retaining surface 111 is parallel to the support plane P.

In the embodiment as shown in FIGS. 1A-1G, the transfer device 101 further comprises an arm 103 that is rotatable about an arm axis B. Preferably, said arm axis B is parallel to the retaining surface 111. The retaining member 110 is carried by said arm 103. In particular, the retaining member 110 is associated with said arm 103 to rotate together with said arm 103 about the arm axis B. The retaining member 110 is spaced apart from the arm axis B. In particular, the retaining member 110 is radially spaced apart from the arm axis B. Moreover, in the embodiment as shown, the retaining member is offset with respect to the arm axis B in an offset direction perpendicular to the retaining surface 111. The arm 103 is arranged to rotate the retaining member 110 between the pick-up position and the release position, i.e. the retaining path S is a circular or substantially circular path. In other words, the inverting axis coincides with the arm axis B.

As is best shown in FIG. 1B, the retaining member 110 is rotatable with respect to the arm 103 about a retaining axis D. Said retaining axis is parallel to the arm axis B and spaced apart from said arm axis B.

As is further shown in FIGS. 1A-1G, the transfer device 101 further comprises a pressing member 104 for pressing down the leading end LE of the tire component 9 on the support surface 181 of the output conveyor 108. The pressing member 104 is carried by the arm 103. Preferably, said pressing member 104 is arranged on said arm 103 proximate to or near the retaining member 110. More preferably, the pressing member 104 is arranged on the arm 103 radially inward with respect to the retaining member 110.

In this particular embodiment, the pressing member 104 comprises a pressing roller 140 which is rotatable about a roller axis R. The roller axis R is parallel to the retaining surface 111. Preferably, the roller axis R is perpendicular to the guide plane. The pressing member 104 further comprises a pressing drive 141 for moving or displacing the pressing roller 140 in a pressing direction perpendicular to the roller axis R.

The transfer device 101 further comprises a securing member 102 for securing the leading end LE of the tire component 9 to the retaining member 110. The securing member 102 is movable between a secured position, as is for example shown in FIG. 1C, for securing the leading end LE with respect to the retaining surface 111, and an unsecured position, as is for example shown in FIG. 1D, for releasing said leading end LE with respect to the retaining surface 111. The securing member 102 is carried by the arm 103. In the embodiment as shown, the securing member 102 comprises a beam which is pivotable about a pivot axis parallel and spaced apart from the arm axis B. The beam may pivot about said pivot axis to securely press the leading end LE of the tire component 9 to the retaining surface 111.

Figures 5A, 5B:
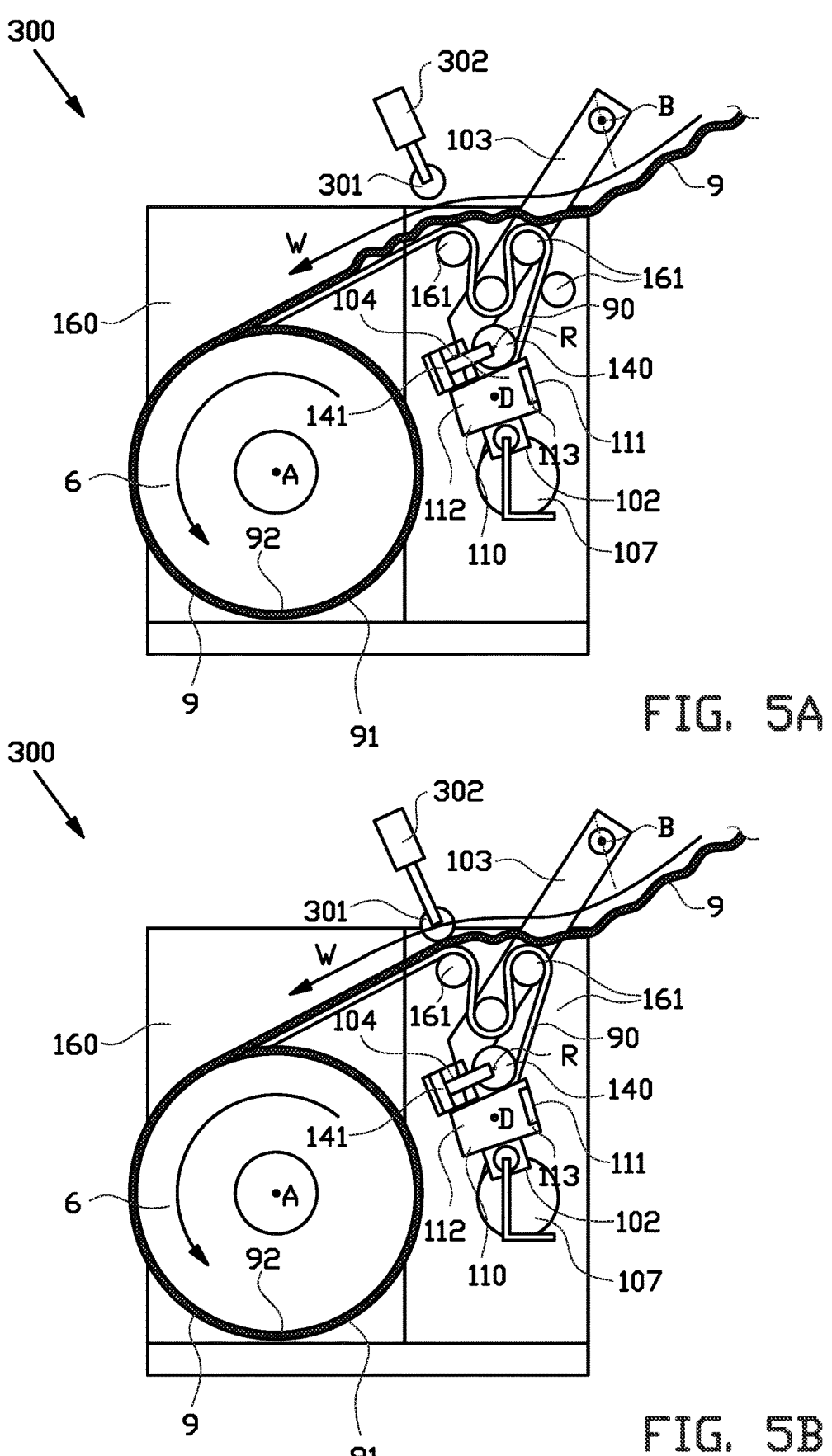
FIGS. 5A and 5B show side views of an alternative unwinding system according to a third exemplary embodiment of the invention.

FIGS. 5A and 5B show an alternative unwinding system 300 according to a third exemplary embodiment of the invention with an anti-wrinkle roll 301 for reducing or ironing out wrinkles in the tire component 9 when said tire component 9 is being wound back onto the stock reel 6 in a wind-up direction W opposite to the transport direction T.

The alternative unwinding system 300 further comprises an anti-wrinkle drive 302 for moving or pressing the anti-wrinkle roll 301 onto the tire component 9 between the pick-up position and the stock reel 6. In particular the anti-wrinkle drive 302 moves said anti-wrinkle roll 301 between an active position opposite to one of the guide rolls 161 of the reel station 160 and an inactive position further spaced apart from said one guide roll 161. In the active position the anti-wrinkle roll 301 cooperates with said one guide roll 161 to press, smoothen and/or flatten any wrinkles in the tire component 9.

Figures 6A, 6B:
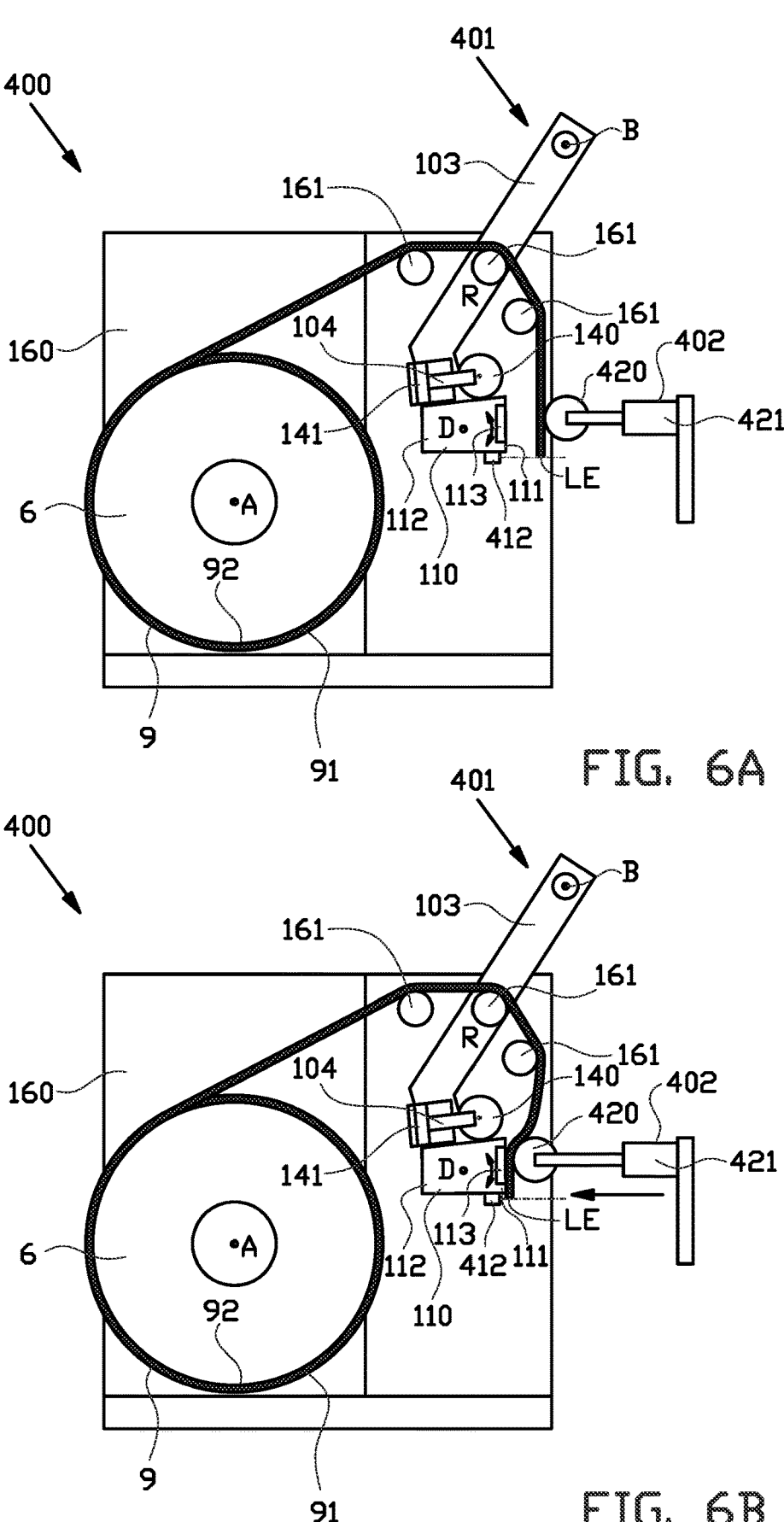
FIGS. 6A-6D show side views of a further alternative unwinding system according to a fourth exemplary embodiment of the invention.
Figures 6C, 6D:
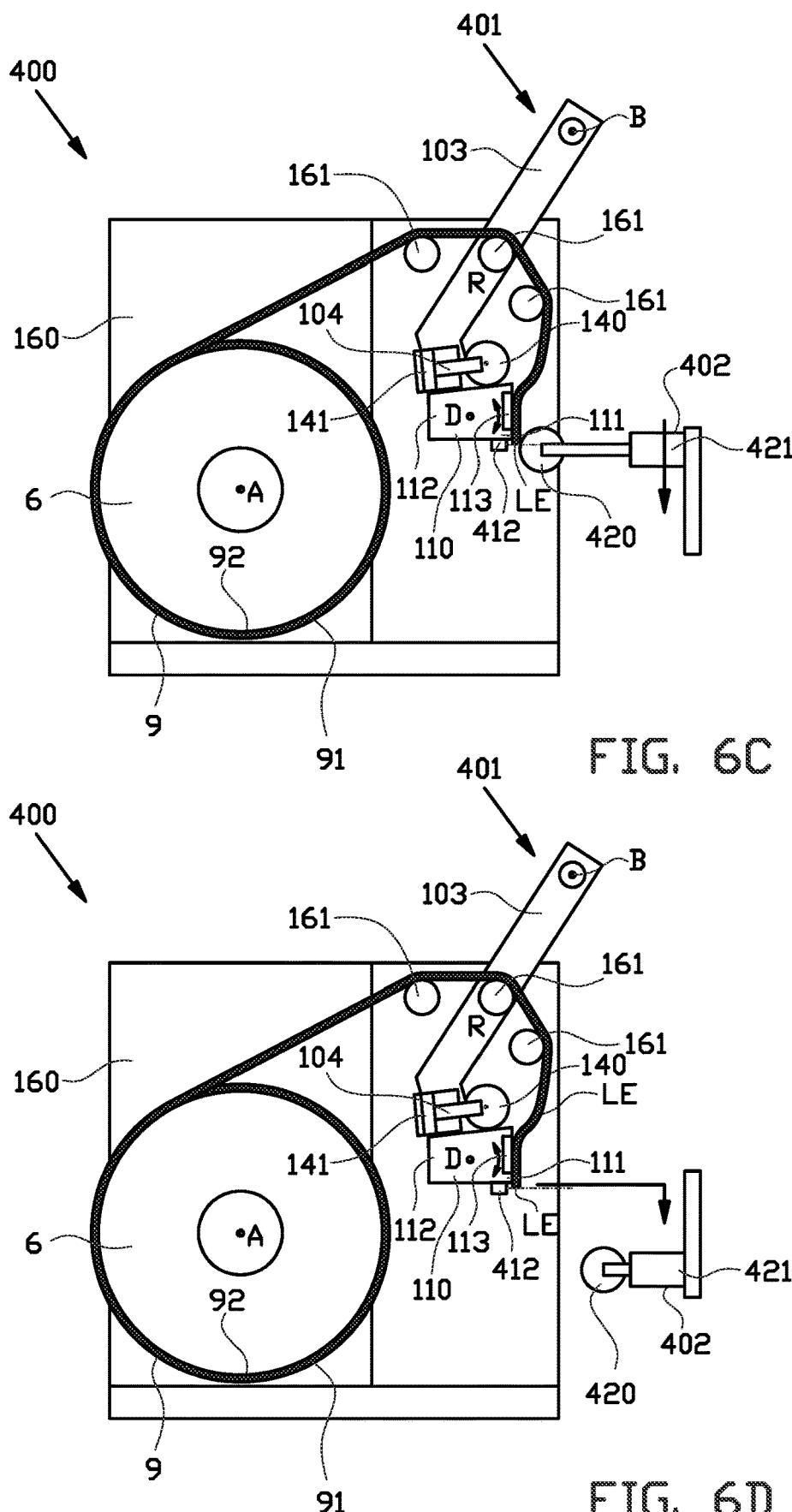

FIGS. 6A-6D show a further alternative unwinding station 400 according to a fourth exemplary embodiment of the invention which differs from the aforementioned unwinding station 100, 400 in that its transfer device 401 is not provided by a securing member carried by the arm 103. Instead, the further alternative unwinding station 400 is provided with a securing member 402 supported separately from the transfer device 401 for pressing, forcing or urging the tire component 9 against the retaining surface 111 of the retaining member 110, as shown in FIGS. 6B and 6C. In particular, the securing member 402 is used to press the tire component 9 against the one or more retaining elements 113 at or in the retaining body 112, as shown in FIG. 6B, such that they can effectively attract and/or retain the tire component 9. Once the tire component 9 has been securely retained, the securing member 402 can be moved away from the retaining member 110, as shown in FIG. 6D, and the retaining member 110 can effectively retain the tire component T from one side only.

The further alternative winding station 400 is further provided with a leading end sensor 412 for detecting the presence or arrival of the leading end LE of the tire component 9 in a specific position relative to the retaining surface 111. The signal of the leading end sensor 412 can be used to stop the feeding of the strip 9 and/or to activate the securing member 402. Hence, the position of the leading end LE relative to the retaining surface 111 can be determined more accurately, which allows for more accurate splicing later in the process.

In this example, the securing member 402 comprises a securing roll 420, in particular a brush roller or a foam roller, for pressing against the tire component 9 and a securing drive 421 for moving the securing roll 420 relative to the retaining surface 111. In this example, the securing drive 421 is configured for moving the securing roll 420 towards and away from the retaining surface 111 in a direction perpendicular to said retaining surface 111, as shown in FIGS. 6A and 6B, but also for moving the securing roll 420 parallel to the retaining surface 111, as shown in FIGS. 6B and 6C, the parallel movement can be used to roll the securing roll 420 over the tire component 9 and thereby progressively press the tire component 9 against said retaining surface 111.

A method for unwinding the tire component 9 from the stock reel 6 will now be described using FIGS. 1A-1G.

As shown in FIG. 1A the stock reel 6 has been placed in the reel station 160. The leading end LE of the tire component 9 has been suspended from the guide rolls 161 at the output side of the reel station 160. The arm 103 has been rotated about the arm axis B to the pick-up position for picking up the leading end LE of the tire component 9. The securing member 102 is in the unsecured position for enabling receiving the leading end LE to the retaining surface 111.

As is shown in FIG. 1B the stock reel 6 has been rotated about the stock reel axis A to unwind a portion of the tire component 9 from said stock reel 6. The leading end LE of said tire component 9 has been displaced to a position opposite to the retaining surface 111. The retaining member 110 has been rotated about the retaining axis D to align the retaining surface 111 with the second surface 92 of the tire component 9. The securing member 102 is now rotated from the unsecured position to the secured position to displace the leading end LE of the tire component 9 towards and in contact with the retaining surface. Subsequently, the leading end LE is retained to said retaining surface 111 using the vacuum elements (not shown).

As is shown in FIG. 1C, arm 103 has been rotated about the arm axis B from the pick-up position to an intermediate position. The retaining member 110 has been moved along the guide path S together with the arm 103. The leading end LE is of the tire component 9 is retained by the retaining member 110. Additionally, the leading end LE of the tire component 9 is secured to the retaining surface 111 by the securing member 102. Due to the displacement of the leading end LE of the tire component along the guide path S, a section of the tire component 9 has been unwound from the stock reel 6.

As is shown in FIG. 1D, the arm 103 has been rotated further about the arm axis B towards a further intermediate position proximate to the release position. The retaining surface 111 now faces the support surface 181 at the first side of the support plane P. The securing member 102 has been moved to the unsecured position. Hence, the leading end LE is now retained by the retaining member 110 only.

As is shown in FIG. 1E, the arm 103 has been rotated further about the arm axis B towards the release position. The retaining member 110 now presses the leading end LE of the tire component 9 on the support surface 181. In particular, the first surface 91 of the tire component 9 has been brought into contact with the support surface 181. The vacuum elements of the retaining member 110 have been deactivated to release the leading end LE of the tire component. The pressing roller 140 has been displaced into contact with the second surface 92 of the tire component 9 by actuating the pressing actuator 141.

Additionally or alternatively, the rotation of the loop wheel 182 can be fixed, for example by using a brake, to prevent that the tire component 9 slips back into the loop. In yet a further alternative embodiment, retaining elements, such as vacuum means, are provided at the conveyor 108 to retain the tire component 9 in position on the support surface 181.

Figure 1F:
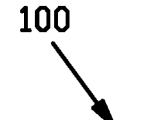

As is shown in FIG. 1F, the pressing actuator 141 has been actuated to press said pressing roller 140 firmly onto the tire component 9. The arm 103 has rotated away from the pick-up position. The retaining surface 111 has now fully released the leading end LE of the tire component 9. The output conveyor 108 is now driven to convey the leading end LE of the tire component 9 in the transport direction T.

Figure 1G:
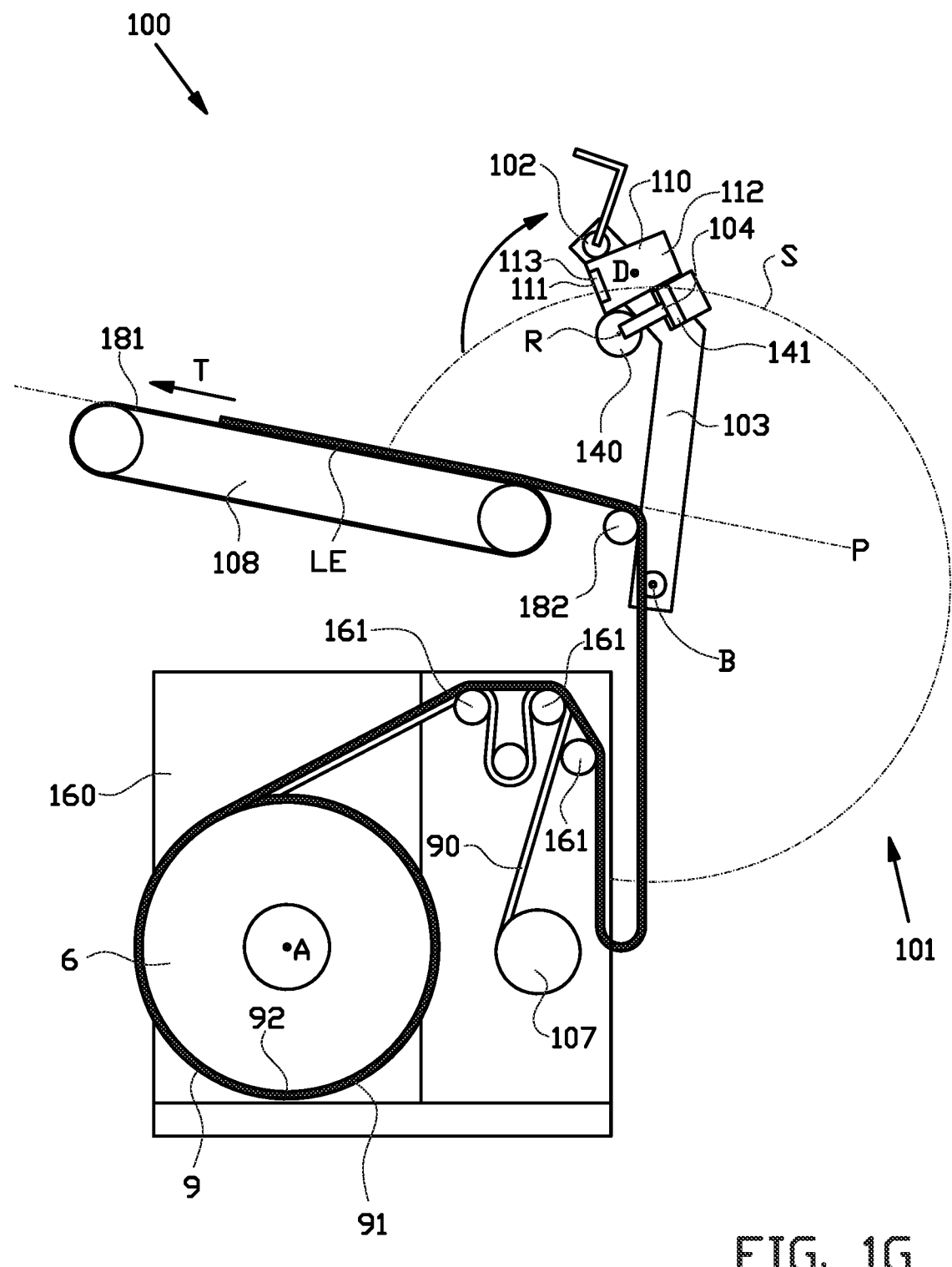

As is shown in FIG. 1G, the leading end LE of the tire component 9 has been conveyed further in the transport direction T. The arm 103 has been rotated into and idle position in which the retaining member 110 and the pressing member 104 no longer contact the tire component 9. The leading end LE of the tire component 9 is now retained by the output conveyor 108, for example by gravity and/or the tackiness of the tire component 9. Subsequently, the tire component 9 is transported further in the transport direction T.

The retaining member 10 may be moved back to the pick-up position for picking up a leading end LE of a subsequent tire component 9, for example for a switchover to a new batch or a new cycle of the method. Preferably, retaining member 10 is moved back to the pick-up position along the guide path S. In other words, the arm 103 is rotated backwards from the release position to the pick-up position.

Alternatively, an unused or waste length of the tire component 9 may be transferred or fed back towards the reel station 60. This may be useful to clear the output conveyor 108 prior to a switchover to a new batch or a new cycle of the method. In particular, the retaining member 10 may be positioned in the release position overhead the tire component 9 at or near the leading end LE of said tire component 9. Subsequently, the leading end LE may be engaged in a similar way as described before. The retaining member 10 may then be returned from the release position to pick-up position. Preferably, the leading end LE is returned from the release position to the pick-up position while the stock reel 6 is rotated to wind the tire component around said stock reel 6.

FIGS. 2A-2D show an alternative unwinding system 200 according to a further embodiment of the present invention. The unwinding system 200 comprises an alternative reel station 260, an alternative output conveyor 208 and an alternative transfer device 201.

The reel station 260 differs from the previously discussed reel station 160 in that is further comprises a liner reel for winding up the liner 90 which is wound around the stock reel 6 together with the tire component.

The output conveyor 208 differs from the previously discussed output conveyor 108 in that the support surface 281 extends in a transport direction T in a horizontal or substantially horizontal support plane S. The support plane S may, however, extend at an oblique angle with respect to the horizontal plane. The output conveyor 208 further comprises a loop wheel 282 for supporting and guiding a loop of the tire component 9 towards the support surface 281. Said loop wheel 282 is rotatable about a rotation axis parallel to the support plane P and perpendicular to the transport direction T.

Figure 3:
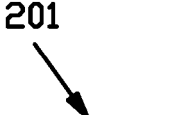
FIG. 3 shows a section view of a transfer device of the alternative unwinding system according to the line III-III in FIG. 2A.
Figure 3:
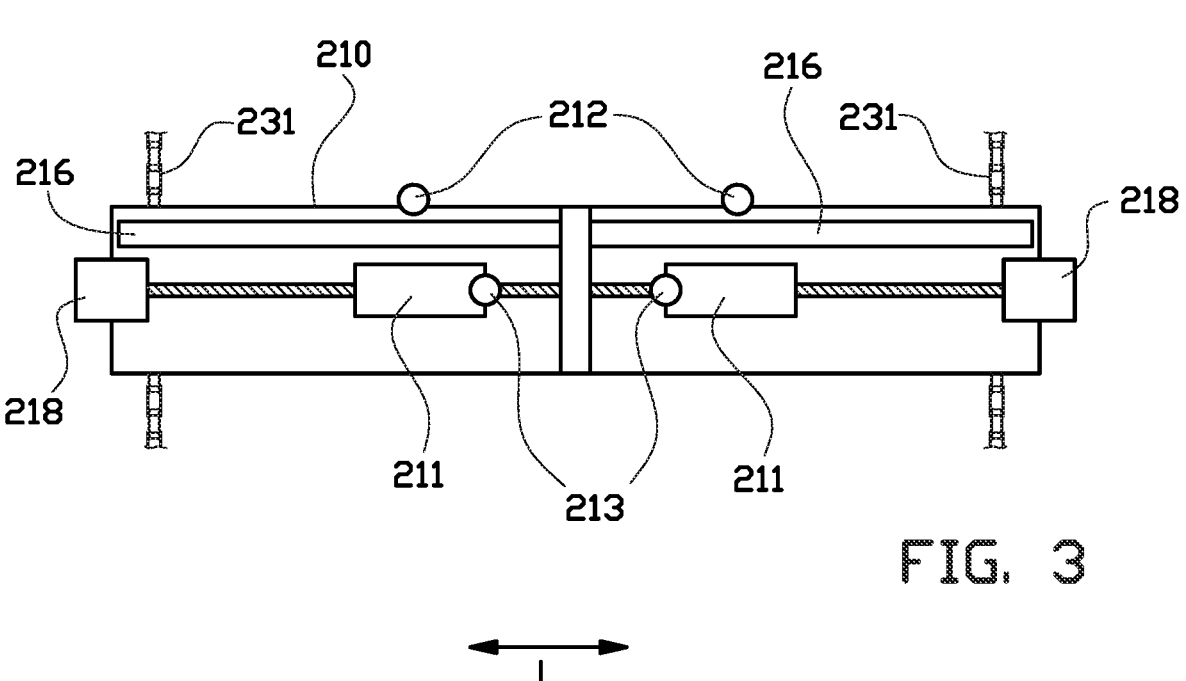

As is best shown in FIGS. 3 and 4A-4G, the transfer device 201 comprises an alternative retaining device 210 for retaining the leading end LE of the tire component 9. In particular, as is shown in FIG. 3, the retaining device 210 comprises two retaining surfaces 211 for retaining two tire components 9, such as two side walls. Alternatively, the two retaining surfaces 211 may retain lateral regions of a single tire component 9.

Figures 2A, 2B:
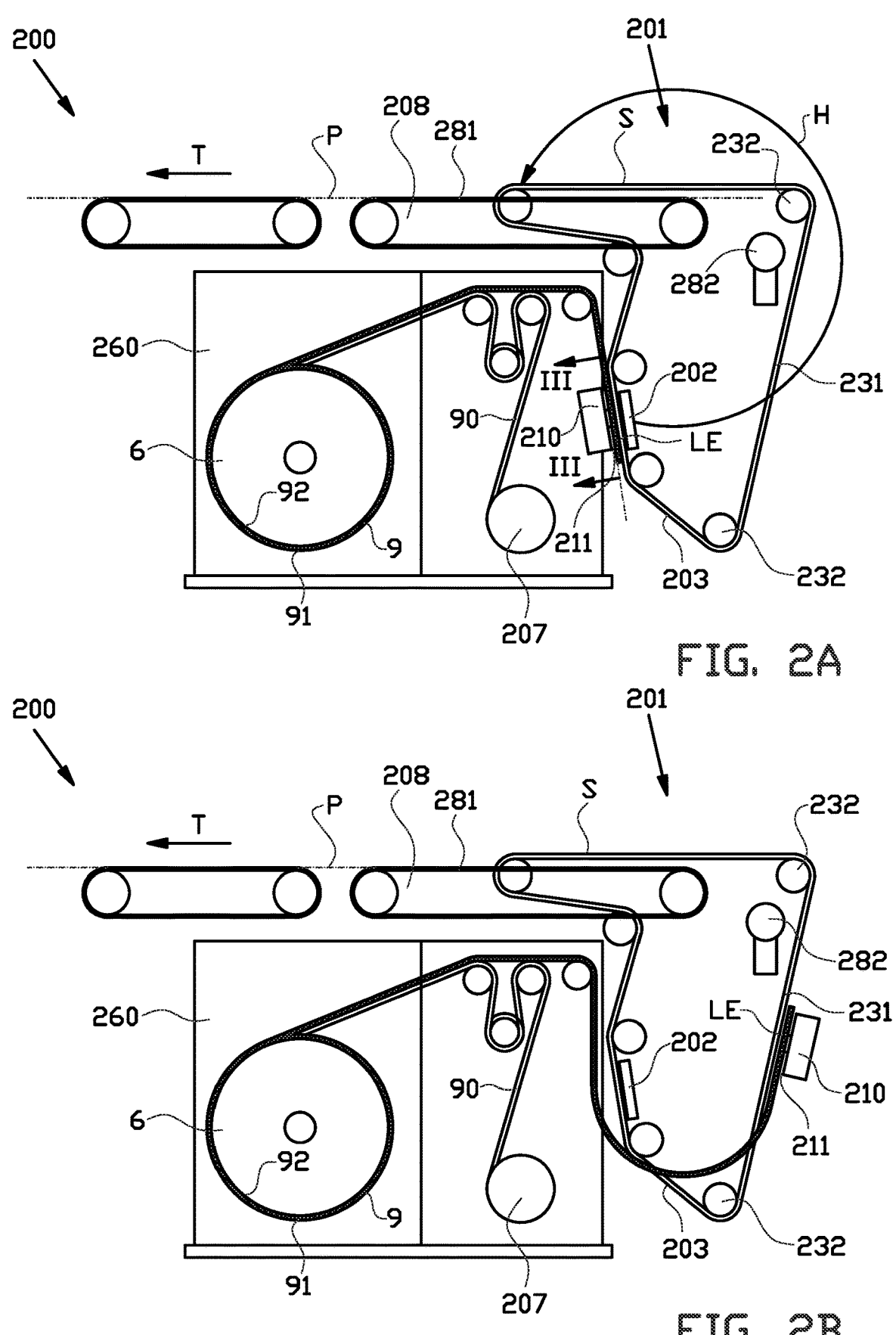
FIGS. 2A-2D show side views of an alternative unwinding system during a process of transferring a tire component from a stock reel to an output conveyor of the alternative unwinding system, according to a second exemplary embodiment of the invention.
Figures 2C, 2D:
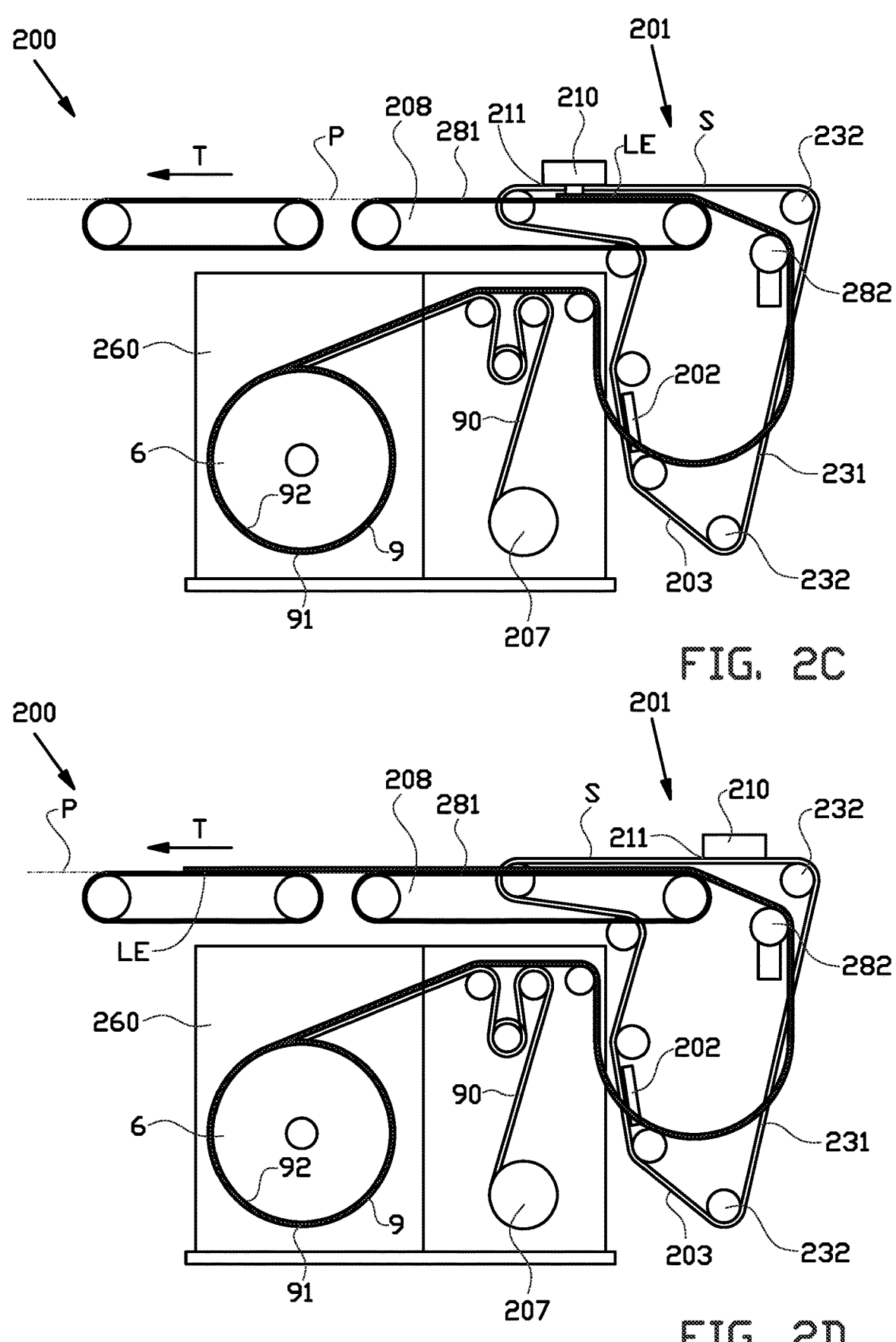

As is shown in FIGS. 2A-2D, the transfer device 201 comprises an endless drive 203 for driving the retaining member 210 along a guide path S between the pick-up position, as shown in FIG. 2A, and the release position, as shown in FIG. 2C.

As is best shown in FIG. 3, the endless drive 203 comprises two endless elements 231. Said endless elements 231 may for example belts, toothed belts or chains. The endless elements 231 are spaced apart in a lateral direction L perpendicular to the guide plane. Preferably, the endless elements 231 each extend in a respective plane parallel to the guide plane. As can be seen in FIGS. 2A-2D, the endless elements are guided around sprockets 232. The guide path S of the retaining member 210 is defined by the endless elements 231 arranged around said sprockets 232. Preferably, at least one of the sprockets 232 is a driven sprocket 232 for driving the endless elements 231 along the guide path S.

As can further be seen in FIG. 3, a part or section of the guide path S at or near the release position extends parallel to the support plane P. i.e. in the transport direction T.

Preferably, the endless drive 203 is arranged to drive the retaining member 210 along said section at the same speed as the output conveyor 208.

As is further shown in FIG. 3, the retaining member 210 comprises two leading end sensors 212 for each detecting the presence of a respective leading end LE of the tire components 9 at or near the retaining surfaces 211. The leading end sensors 212 are movable together with the retaining member 210. Alternatively, the leading end sensors LE may be positioned stationary at or near the pick-up position.

The two retaining surfaces 211 of the retaining member 210 are mutually spaced apart in the lateral direction L. In this particular embodiment, said retaining surfaces 211 are movable relative to one another. The retaining member 210 comprises two lateral drives 218 for each driving a respective one of the retaining surfaces 211 in the lateral direction L. In particular, said lateral drives 218 are spindle drives. Alternatively, the retaining member may comprise a single lateral drive for simultaneously driving the retaining surfaces 211 towards or away from each other, e.g. a double treaded spindle drive. In a further alternative embodiment, only one of the retaining surfaces 211 is movable in the lateral direction L to affect the mutual displacement.

As is further shown in FIG. 3, the retaining member 213 further comprises two lateral sensors 213 for each detecting a lateral side of the tire components 9. The leading end sensors 212 and the lateral sensors 213 may for example be optic sensors, proximity sensors or tactile sensors.

As is shown in FIGS. 4A-4G, the retaining member 210 comprises at least two nails 215 for retaining the tire component 9. In particular, the retaining member 210 comprises a nail base 214 and a base drive 216 for driving said nail base 214 in a direction transverse or perpendicular to the retaining surface 211 for bringing said retaining surface 211 in contact with the tire component 9. The base drive 216 may for example be a pneumatic drive or a servo motor.

The retaining member 210 further comprises a nail drive 217 for moving the at least two nails 215 between a retracted position, in which said nails 215 are recessed with respect to the retaining surface 211, and a gripping position, in which the at least two nails 215 protrude from the retaining surface 211 for retaining the tire component 9 to said retaining surface 211.

The at least two nails 215 each extend in a respective nail direction transverse or perpendicular to the retaining surface 211. In particular, the nail direction of a first one of the at least two nails 215 and the nail direction of a second one of the at least two nails 215 extend at an oblique angle with respect to one another.

As is further shown in FIGS. 2A-2D, the unwinding system 200 further comprises a support member 202 that is positioned opposite to the retaining surface 211 of the retaining member 210. Said support surface 202 is arranged for supporting the leading end LE of the tire component 9 in the pick-up position when said leading end LE is engaged by the retaining member 210. In particular, said support member 202 is arranged to prevent the nails 215 from pushing away the leading end LE of the tire component.

A method for unwinding the stock reel 6 using the unwinding system 200 according to the present invention is now described using FIGS. 2A-2D, 3 and 4A-4G.

As is shown in FIGS. 2A and 3, the retaining member 210 is positioned in the pick-up position. The respective leading ends LE of the tire components 9 have been fed between the retaining member 210 and the support member 202 until the presence of said leading ends LE was detected by the respective leading end sensors 212. In particular, the liner reel 207 has been rotated to wind up the liner 90 and, consequently, to drive the stock reel 6 in rotation about the stock reel axis A.

Figures 4A, 4B, 4C:
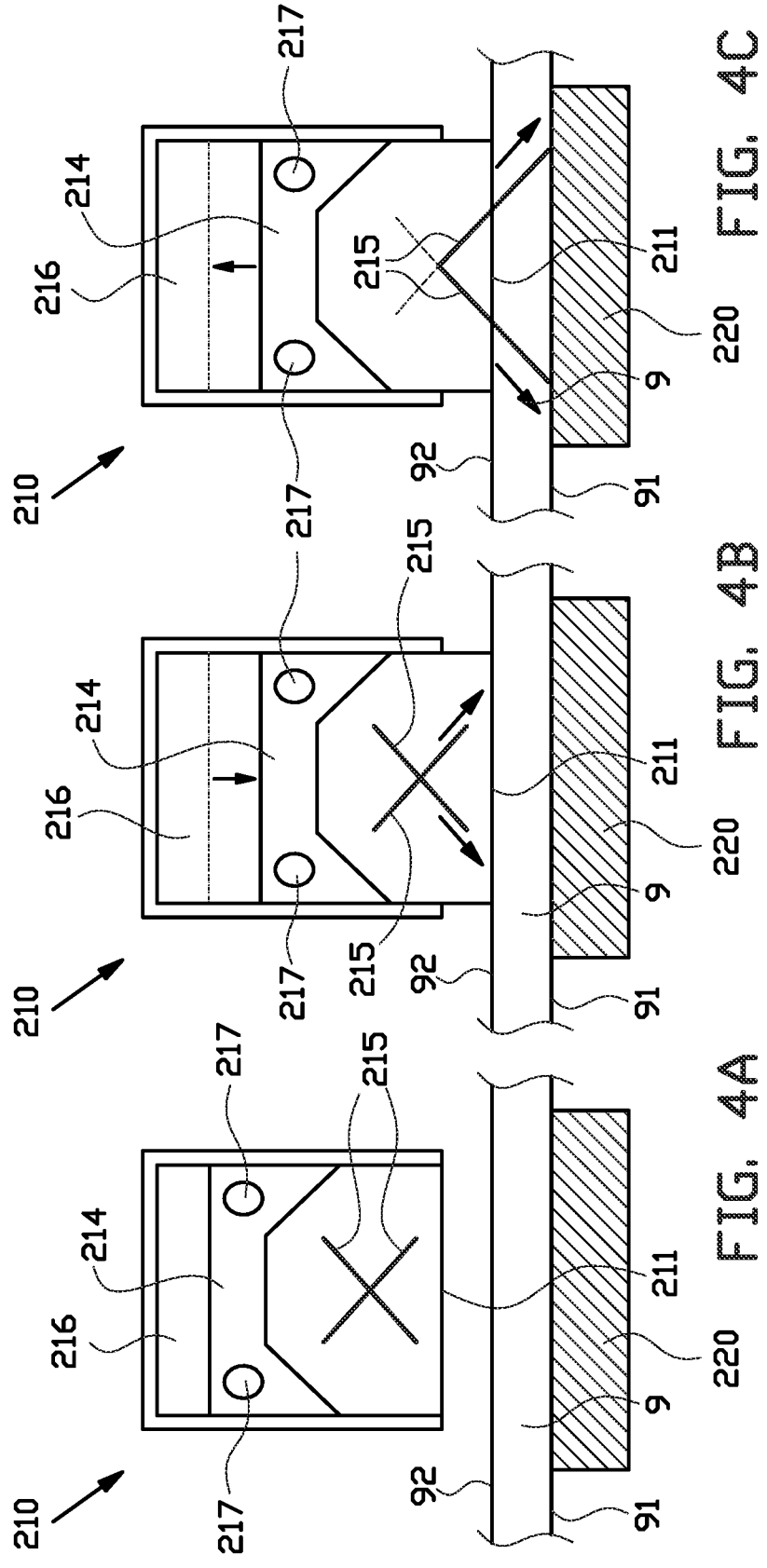

The respective lateral sides of the tire components are detected using the lateral sensors 213. Accordingly, the retaining surfaces 211 are now displaced relative to one another in the lateral direction L in response to the sensor signals of said lateral sensors 213. As shown in FIG. 4A, the tire component 9 is supported against the support member 202. In particular the first surface 91 is in abutment with said support member 202. The retaining surface 211 is spaced apart from the second surface 92 of the tire component 9.

As is shown in FIG. 4B, the base drive 216 has been actuated to move the base 216 towards the tire component 9. In particular, the retaining surface 211 has been moved into abutment with the second surface 92 of the tire component 9.

As is shown in FIG. 4C, the nail drives 217 have been actuated to drive the nails 215 through the second surface 92 and into the tire component 9. The tire component 9 is now retained by said retaining member 210.

As is shown in FIG. 4D, the base drive 216 has been actuated to move the base 216 away from the support member 202. Consequently, the tire component 9 has been lifted away from said support member 202.

As is shown in FIG. 2B, the retaining member 210 has been moved by the endless drive 203 along the guide path S into an intermediate position.

As is shown in FIG. 2C, the retaining member 210 has been moved into the release position above the support surface 281 of the output conveyor 208. The retaining member 210 has been moved along the support plane P, such that a part of the tire component 9, sufficient to be retained to the output conveyor 208 by friction, has been guided over the support surface 281. The retaining member 210 may either be arranged to retain the leading end LE at a distance from said support surface 281 or at the support surface 281. As may further be observed, the tire component 9 has been guided around the loop wheel 282.

As is further shown in FIG. 4E the base drive 216 has been actuated to move the nail base 214 towards the support surface 281. The first side 91 of the tire component 9 has been brought in abutment with said support surface 281.

As is shown in FIG. 4F, the nail drives have been actuated to retract the nails 215 from the tire component 9. In particular, the nails 215 have been retracted into their respective recessed positions. The tire component 9 has now been released from the retaining surface 211.

As is shown in FIG. 4G, the base drive 216 has been actuated to move the nail base 214 away from the tire component 9. The retaining surface 211 and the second surface 92 of the tire component 9 are spaced apart.

As is shown in FIG. 2D, the tire component 9 is conveyed in the transport direction T by the output conveyor 208. The retaining member 210 has been moved to an idle position. The retaining member 210 may be moved back to the pick-up position for picking up a leading end LE of a subsequent tire component 9, for example for a switchover to a new batch or a new cycle of the method. Preferably, the retaining member 210 is moved back to the pick-up position along the guide path S. In other words, the endless drive 203 is reversed or driven in a reversed direction.

Alternatively, an unused or waste length of the tire component 9 may be transferred or fed back towards the reel station 260. This may be useful to clear the output conveyor 208 prior to a switchover to a new batch or a new cycle of the method. In particular, the retaining member 210 may be positioned in the release position overhead the tire component 9 at or near the leading end LE of said tire component 9. Subsequently, the leading end LE is engaged in a similar way as described before. The retaining member 210 is then returned from the release position to the pick-up position, where the leading is transferred back to the stock reel 6. Preferably, the stock reel 6 is rotated while returning the leading end LE from the release position to the pick-up position to wind the tire component 9 around said stock reel 6.

In summary, the invention relates to an unwinding system for unwinding a tire component from a stock reel and outputting said tire component in a transport direction, wherein the unwinding system comprises a reel station, an output conveyor and a transfer device, wherein the output conveyor extends at least partially above the reel station, wherein the transfer device comprises a retaining surface for releasably retaining the tire component along a guide path between a pick-up position for picking up the tire component from the reel station and a release position for disposing the tire component on the output conveyor, wherein, in the release position, the retaining surface is facing towards the output conveyor, and wherein the retaining surface is offset between the release position and the pick-up position over an offset angle of at least ninety degrees around an inverting axis that is parallel to the conveyor and perpendicular to the transport direction.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An unwinding system for unwinding a tire component from a stock reel and for outputting said tire component in a transport direction, the unwinding system comprising:

a reel station configured for receiving the stock reel;

an output conveyor for conveying the tire component in the transport direction; and a transfer device for transferring a leading end of the tire component from the reel station to said output conveyor, wherein the output conveyor extends at least partially above the reel station and comprises a support surface extending in a support plane parallel to the transport direction, wherein said support surface is arranged for receiving the tire component from the transfer device and for supporting said tire component at a first side of the support plane, wherein the transfer device comprises a retaining member which is movable along a guide path between a pick-up position at a second side of the support plane opposite to the first side of the support plane, for picking up the leading end of the tire component from the reel station, and a release position at the first side of the support plane for disposing the leading end of the tire component on the support surface of the output conveyor, wherein the retaining member comprises a retaining surface for releasably retaining the leading end of the tire component to said retaining member, wherein, in the release position, the retaining surface is facing towards the support plane at the first side of said support plane, and wherein the retaining surface is offset between the release position and the pick-up position over an offset angle of at least ninety degrees around an inverting axis that is parallel to the support plane and perpendicular to the transport direction.

2. The unwinding system according to claim 1, wherein the retaining member comprises a retaining body that defines the retaining surface and one or more retaining elements for retaining the leading end of the tire component to said retaining body at the retaining surface.

3. The unwinding system according to claim 1, wherein the retaining member is movable along the guide path to an intermediate position between the pick-up position and the release position, and wherein, in the intermediate position, the retaining surface faces away from the support plane at the second side of said support plane.

4. The unwinding system according to claim 1, wherein the unwinding system further comprises the stock reel at the reel station, wherein the stock reel is rotatable about a stock reel axis, and wherein the retaining surface of the retaining member faces away from the stock reel axis when the retaining member is in the pick-up position, and faces towards the stock reel axis when the retaining member is in the release position.

5. The unwinding system according to claim 1, wherein the retaining member comprises one or more vacuum retaining elements for picking-up or retaining the leading end by suction.

6. The unwinding system according to claim 1, wherein the guide path is a circular path.

7. The unwinding system according to claim 1, wherein the transfer device comprises an arm that is rotatable about an arm axis between the pick-up position and the release position, wherein the retaining member is carried by said arm and spaced apart from the arm axis.

8. The unwinding system according to claim 7, wherein the retaining surface is offset with respect to the arm axis in an offset direction perpendicular to said retaining surface.

9. The unwinding system according to claim 7, wherein the retaining member is rotatable with respect to the arm about a retaining axis parallel to and spaced apart from the arm axis.

10. The unwinding system according to claim 7, wherein the transfer device further comprises a pressing member for pressing down the leading end of the tire component on the support surface of the output conveyor when said transfer device has released said leading end, wherein the pressing member is carried by the arm between the pick-up position and the release position.

11. The unwinding system according to claim 10, wherein the pressing member comprises a pressing roller which is rotatable about a roller axis.

12. The unwinding system according to claim 7, wherein the transfer device further comprises a securing member that is movable between a secured position for securing the leading end to the retaining member and an unsecured position for releasing the leading end from the retaining member, wherein said securing member is carried by the arm.

13. The unwinding system according to claim 1, wherein the transfer device further comprises a securing member that is movable between a secured position for securing the leading end to the retaining member and an unsecured position for releasing the leading end from the retaining member, wherein the securing member is supported separately from the transfer device for pressing the tire component against the retaining surface of the retaining member.

14. The unwinding system according to claim 1, wherein the transfer device comprises an endless drive for driving the retaining member along the guide path between the pick-up position and the release position.

15. The unwinding system according to claim 14, wherein the guide path extends parallel to and spaced apart from the support plane at or near the release position.

16. The unwinding system according to claim 14, wherein the guide path extends in a guide plane, wherein the endless drive comprises two endless drive elements extending parallel to said guide plane and mutually spaced apart in a lateral direction perpendicular to the guide plane.

17. The unwinding system according to claim 16, wherein the endless drive elements are belts or chains.

18. The unwinding system according to claim 14, wherein the unwinding system further comprises a support member that is positioned opposite to the retaining surface at the pick-up position for supporting the leading end of the tire component relative to the retaining surface.

19. The unwinding system according to claim 1, wherein the retaining member comprises at least two retractable nails that are movable between a retracted position, in which the nails are recessed with respect to the retaining surface, and a gripping position, in which said nails protrude from the retaining surface for retaining the tire component to said retaining surface.

20. The unwinding system according to claim 19, wherein the at least two nails each extend in a respective nail direction transverse or perpendicular to the retaining surface, wherein the nail direction of a first one of the at least two nails and the nail direction of a second one of the at least two nails extend at an oblique angle with respect to one another.

21. The unwinding system according to claim 1, wherein the transfer device comprises at least one leading end sensor for detecting the presence of the leading end of the tire component at the retaining member.

22. The unwinding system according to claim 1, wherein the guide path extends in a guide plane, wherein the transfer device comprises two retaining surfaces for retaining two tire components, respectively, wherein the two retaining surfaces are spaced apart in a lateral direction perpendicular to said guide plane.

23. The unwinding system according to claim 22, wherein said retaining surfaces are movable with respect to one another in the lateral direction.

24. The unwinding system according to claim 23, wherein said retaining surfaces are individually movable in the lateral direction.

25. The unwinding system according to claim 23, wherein the transfer device comprises at least one lateral drive for respectively moving said retaining surfaces in the lateral direction.

26. The unwinding system according to claim 22, wherein the retaining device comprises two lateral sensors for each detecting a lateral side of a respective one of the two tire components.

27. The unwinding system according to claim 1, wherein the unwinding system further comprises an anti-wrinkle roll and an anti-wrinkle drive for pressing the anti-wrinkle roll onto the tire component between the pick-up position and the stock reel.

28. The unwinding system according to claim 27, wherein the reel station comprises one or more guide rolls for guiding the leading end of the tire component towards the pick-up position, wherein the anti-wrinkle roll is configured to cooperate with one guide roll of the one or more guide rolls.

29. The unwinding system according to claim 1, wherein the unwinding system is provided with a sensor for detecting a parameter indicative of the lateral position of the tire component at the leading end thereof in a lateral direction parallel to the support plane prior to the transfer of said leading end to the output conveyor.

30. The unwinding system according to claim 29, wherein the sensor is configured for detecting the parameter at a position upstream of the pick-up position.

31. The unwinding system according to claim 29, wherein the unwinding system further comprises a lateral drive for generating a relative displacement between the output conveyor and at least a part of the reel station in the lateral direction and a control unit that is operationally connected to the sensor and the lateral drive for controlling the lateral drive in response to signals received from the sensor.

32. The unwinding system according to claim 31, wherein the lateral drive is configured for moving at least a part of the reel station in the lateral direction.

33. A method for unwinding a tire component from a stock reel and for outputting said tire component in a transport direction, using an unwinding system, wherein the unwinding system comprises:

a reel station configured for receiving the stock reel;

an output conveyor for conveying the tire component in the transport direction; and a transfer device for transferring a leading end of the tire component from the reel station to said output conveyor, wherein the output conveyor extends at least partially above the reel station and comprises a support surface extending in a support plane parallel to the transport direction, wherein said support surface is arranged for receiving the tire component from the transfer device and for supporting said tire component at a first side of the support plane, wherein the transfer device comprises a retaining member which is movable along a guide path between a pick-up position at a second side of the support plane opposite to the first side of the support plane, for picking up the leading end of the tire component from the reel station, and a release position at the first side of the support plane for disposing the leading end of the tire component on the support surface of the output conveyor, wherein the retaining member comprises a retaining surface for releasably retaining the leading end of the tire component to said retaining member, wherein, in the release position, the retaining surface is facing towards the support plane at the first side of said support plane, and wherein the retaining surface is offset between the release position and the pick-up position over an offset angle of at least ninety degrees around an inverting axis that is parallel to the support plane and perpendicular to the transport direction, the method comprising the steps of:

using the transfer device to pick-up the leading end of the tire component originating from the stock reel at the pick-up position at the reel station;

retaining the leading end to the retaining surface while guiding said leading end along the guide path from the pick-up position to the release position;

transferring said leading end onto the support surface of the output conveyor in the release position by releasing said leading end of the tire component from the retaining surface.

34. The method according to claim 33, wherein the method further comprises the step of:

transferring the leading end of the tire component from the release position at the output conveyor back to the pick-up position at the reel station.

35. The method according to claim 34, wherein the method further comprises the steps of:

providing an anti-wrinkle roll at the reel station; and pressing the anti-wrinkle roll onto the tire component between the pick-up position and the stock reel when the tire component is wound back onto the stock reel in a wind-up direction opposite to the transport direction.

36. The method according to claim 33, wherein the transfer device further comprises a pressing member for pressing down the leading end of the tire component on the support surface of the output conveyor, wherein the method further comprises the step of pressing down the tire component on the support surface of the output conveyor with said pressing member when the transfer device has released the tire component.

37. The method according to claim 33, wherein the method further comprises the steps of:

detecting a parameter indicative of the lateral position of the tire component at the leading end thereof in a lateral direction parallel to the support plane prior to the transfer of said leading end to the output conveyor; and correcting the lateral position of the tire component at the leading end based on the parameter.

38. The method according to claim 33, wherein the transfer device further comprises at least one leading end sensor for detecting the presence of the leading end of the tire component at the retaining surface, wherein, prior to picking up the leading end of the tire component, the method comprises the steps of:

unwinding the tire component towards the retaining surface; and detecting the presence of the leading end at the retaining surface using the at least one leading end sensor;

wherein the step of picking up the leading end of the tire component is performed in response to the sensor signal of the at least one leading end sensor.

39. The method according to claim 33, wherein the guide path extends in a guide plane, wherein the transfer device comprises two retaining surfaces for retaining two tire components, respectively, wherein the two retaining surfaces are movable relative to one another in a lateral direction perpendicular to said guide plane, wherein the retaining device further comprises two lateral sensors for each detecting a lateral side of a respective tire component, wherein, prior to picking up the leading end of the tire component, the method comprises the steps of:

detecting the respective lateral sides of the tire components using the two lateral sensors; and moving the two retaining surfaces relative to one another in response to the signals of the respective lateral sensors for positioning said retaining surfaces relative to the tire components.

* * * * *